United States Patent
Haynes et al.

(10) Patent No.: US 6,959,031 B2
(45) Date of Patent: Oct. 25, 2005

(54) METHOD AND SYSTEM FOR FAST ACQUISITION OF PULSED SIGNALS

(75) Inventors: Leonard S. Haynes, Rockville, MD (US); Mark D. Roberts, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 741 days.

(21) Appl. No.: 09/894,578

(22) Filed: Jun. 28, 2001

(65) Prior Publication Data

US 2002/0018514 A1 Feb. 14, 2002

Related U.S. Application Data

(60) Provisional application No. 60/216,102, filed on Jul. 6, 2000.

(51) Int. Cl.⁷ .................................................. H04B 1/69
(52) U.S. Cl. ..................................................... 375/130
(58) Field of Search ................................ 375/130, 140, 375/316, 340, 354, 371; 370/280, 294, 321, 324, 442, 498, 503

(56) References Cited

U.S. PATENT DOCUMENTS

| | | | |
|---|---|---|---|
| 3,518,555 A | 6/1970 | Konotchick | 327/38 |
| 3,588,707 A | 6/1971 | Manship | 327/152 |
| 3,728,632 A | 4/1973 | Ross | 375/256 |
| 4,170,757 A | 10/1979 | Skudera et al. | 380/34 |
| 4,621,365 A | 11/1986 | Chiu | 375/149 |
| 4,641,317 A | 2/1987 | Fullerton | 375/130 |
| 4,675,880 A | 6/1987 | Davarian | 375/261 |
| 4,743,906 A | 5/1988 | Fullerton | 342/27 |
| 4,813,057 A | 3/1989 | Fullerton | 375/259 |
| 4,901,307 A | 2/1990 | Gilhousen et al. | 370/320 |
| 4,928,316 A | 5/1990 | Heritage et al. | 398/199 |
| 4,979,186 A | 12/1990 | Fullerton | 370/239 |
| 5,363,108 A | 11/1994 | Fullerton | 342/27 |
| 5,377,225 A | 12/1994 | Davis | 370/342 |
| 5,559,519 A | 9/1996 | Fenner | 342/174 |
| 5,610,907 A | 3/1997 | Barrett | 370/342 |
| 5,677,927 A | 10/1997 | Fullerton | 375/130 |
| 5,687,169 A | 11/1997 | Fullerton | 370/324 |
| 5,764,696 A | 6/1998 | Barnes et al. | 375/239 |
| 5,793,759 A | 8/1998 | Rakib et al. | 370/342 |
| 5,809,063 A | 9/1998 | Ashe et al. | 375/141 |
| 5,832,035 A | 11/1998 | Fullerton | 375/149 |
| 5,847,677 A | 12/1998 | McCorkle | 342/204 |
| 6,111,536 A | 8/2000 | Richards et al. | 342/125 |
| 6,133,876 A | 10/2000 | Fullerton et al. | 342/315 |
| 6,160,802 A | 12/2000 | Barrett | 370/342 |
| 6,556,621 B1 * | 4/2003 | Richards et al. | 375/150 |
| 6,577,691 B2 * | 6/2003 | Richards et al. | 375/355 |
| 6,760,387 B2 * | 7/2004 | Langford et al. | 375/267 |

FOREIGN PATENT DOCUMENTS

SE  WO9723071  6/1997  ............. H04J/3/06

OTHER PUBLICATIONS

R.A. Scholtz, Multiple Access with Time–Hopping Impulse Modulation, Communication Sciences Institute, Univ. of Southern California, Los Angeles, Ca., 1993.

* cited by examiner

Primary Examiner—Chieh M. Fan
(74) Attorney, Agent, or Firm—Venable LLP; Robert S. Babayi

(57) ABSTRACT

A method and system for fast acquisition of pulsed radio signals where said signals comprised uniquely-spaced pulses or symbols. The receiver searches for and detects two ore more symbols, determines the interval or intervals between the symbols, and because the intervals are unique, the symbols or symbol sequences are identified. Identification of the symbols and their respective timing within the signal allows the receiver to adjust its timing to synchronize with the full signal.

30 Claims, 20 Drawing Sheets

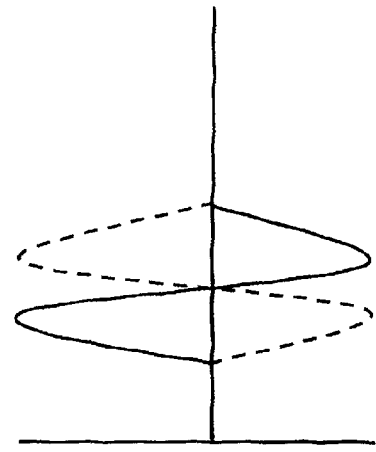
FIG. 4A Early – Late Modulation
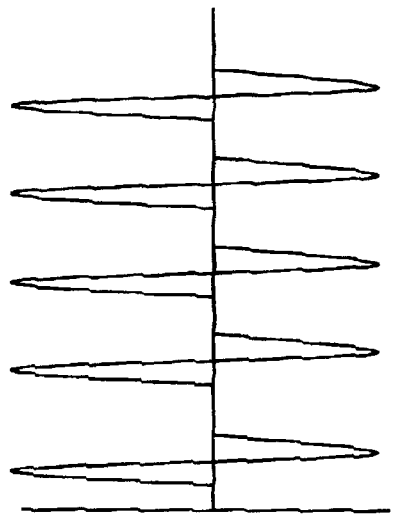
FIG. 4B One of Many Modulation
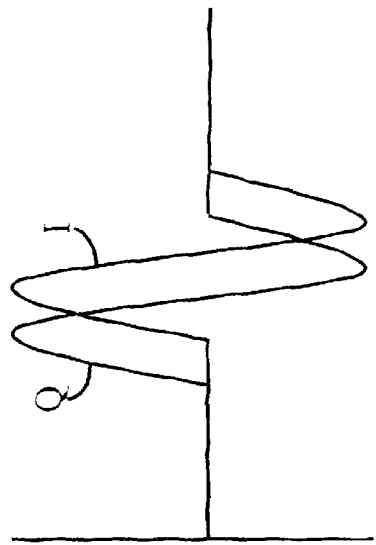
FIG. 4C Flip Modulation
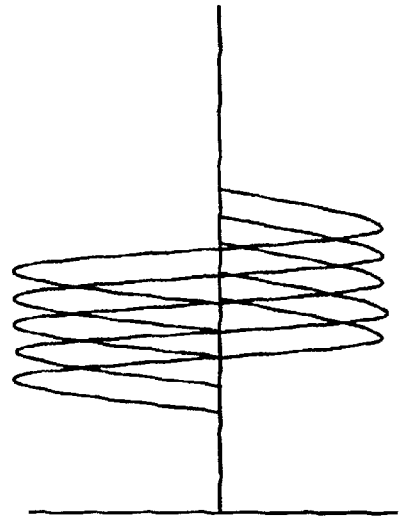
FIG. 4D Quad Flip Modulation
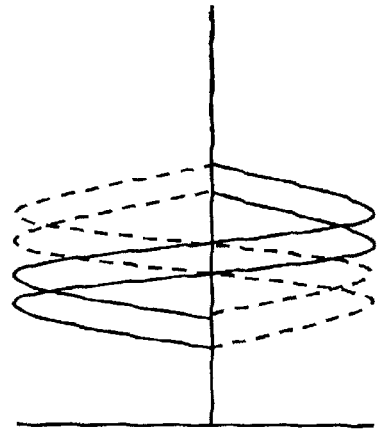
FIG. 4E Vector Modulation

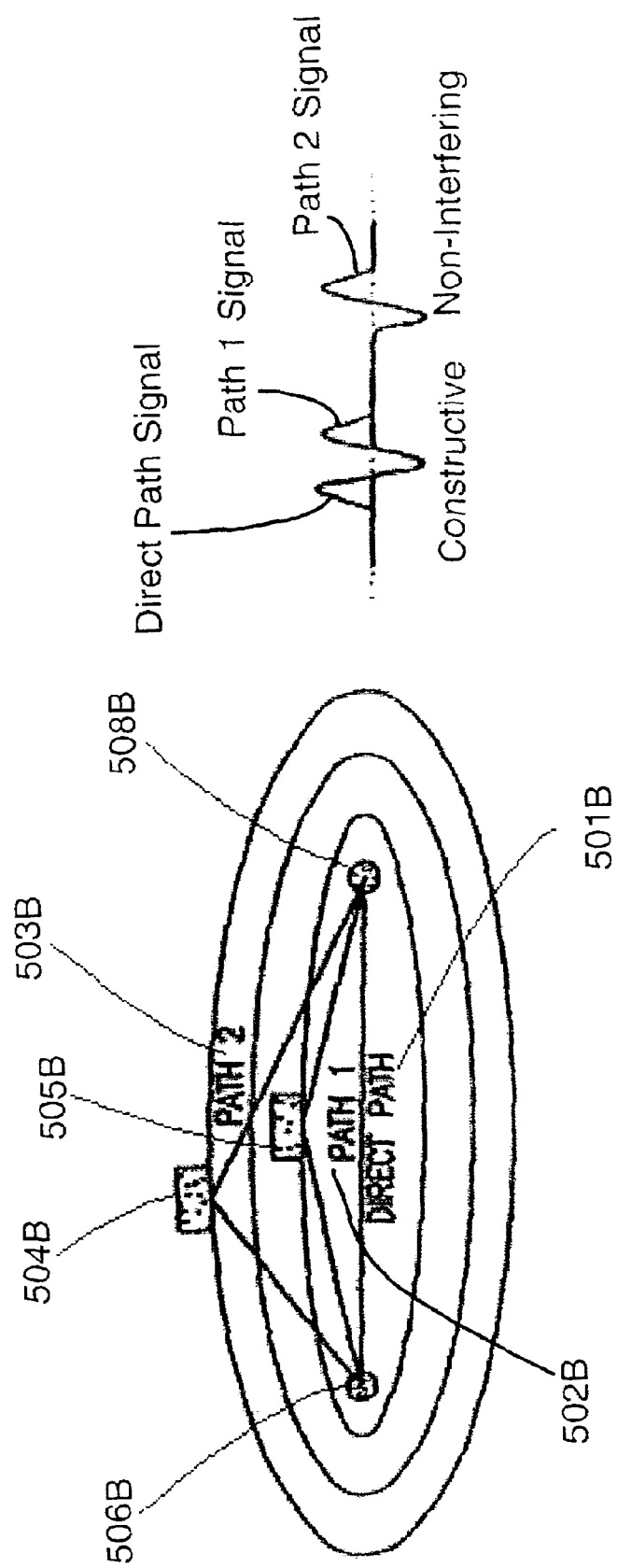

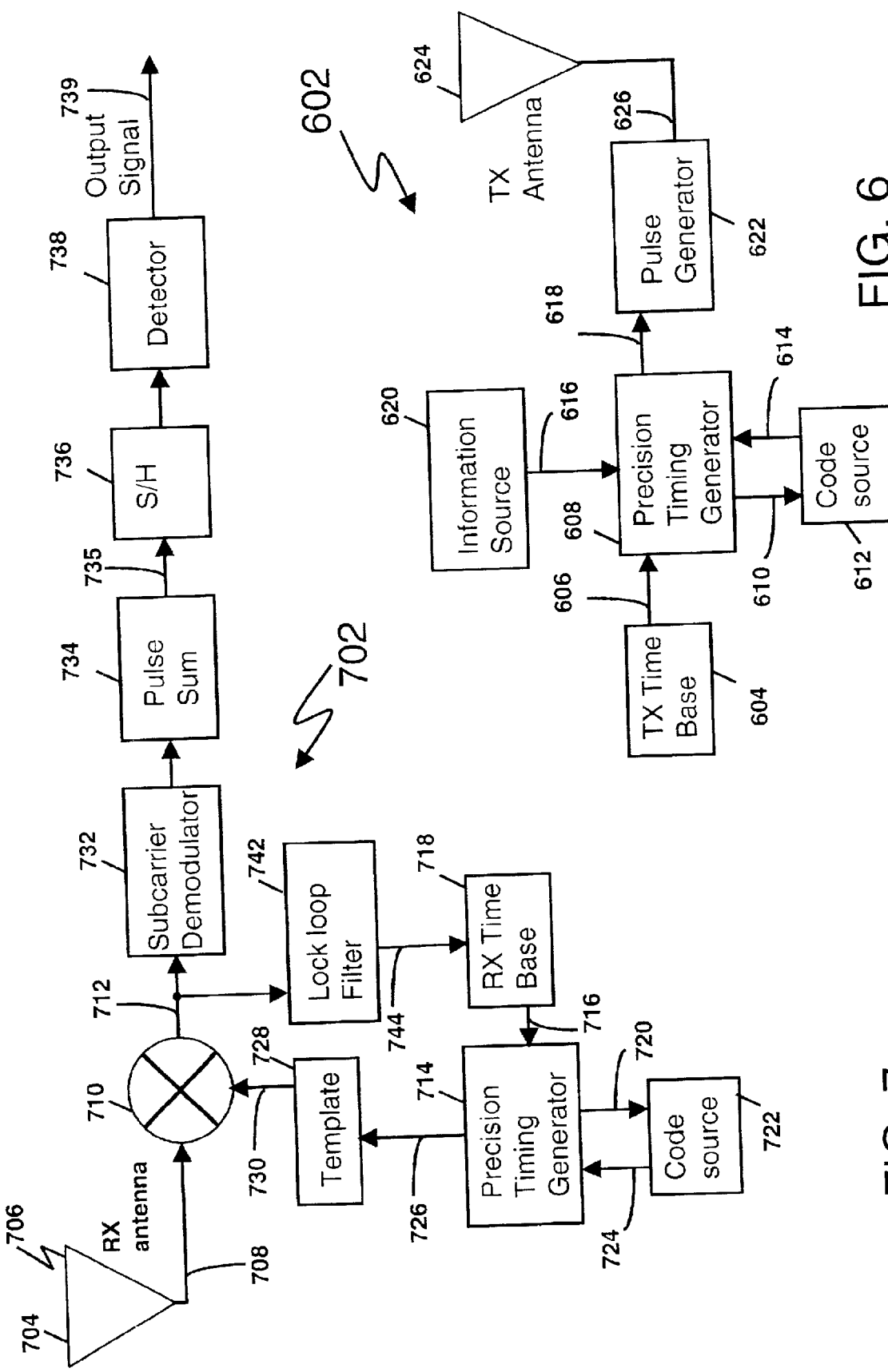

METHOD AND SYSTEM FOR FAST ACQUISITION OF PULSED SIGNALS

PRIORITY

This application claims the benefit of U.S. Provisional Application No. 60/216,102, filed Jul. 6, 2000, which is hereby incorporated by reference.

RELATED ART

Recent advances in communications technology have enabled an emerging, revolutionary ultra-wideband technology (UWB) called impulse radio communications systems (hereinafter called impulse radio).

Impulse radio was first fully described in a series of patents, including the following, which are incorporated herein by reference: U.S. Pat. No. 4,641,317, issued Feb. 3, 1987 to Larry W. Fullerton; U.S. Pat. No. 4,813,057, issued Mar. 14, 1989 to Larry W. Fullerton; U.S. Pat. No. 4,979,186, issued Dec. 18, 1990 to Larry W. Fullerton; and U.S. Pat. No. 5,363,108, issued Nov. 8, 1994 to Larry W. Fullerton. A second generation of impulse radio patents include the following, which are incorporated herein by reference: U.S. Pat. No. 5,677,927, issued Oct. 14, 1997 to Fullerton et al.; U.S. Pat. No. 5,687,169 issued Nov. 11, 1997 to Fullerton et al.; and U.S. Pat. No. 5,832,035, issued Nov. 3, 1998 to Fullerton et al.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain, and interference suppression.

Generally speaking, an impulse radio receiver is a direct conversion receiver with a cross-correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. As an option, the impulse radio receiver can integrate multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods.

When receiving an ultra-wideband signal as part of a one-way communication system (e.g., a pager) or a two-way communication system (e.g., a wireless telephone), a problem exists as to how to detect the transmitted impulse radio signal, and more particularly, how to acquire and lock on the impulse radio signal being transmitted such that the receiver is synchronized with the transmitted signal. This problem exists independent of how the received ultra-wideband signal is used, such as in a one-way or two-way communication system.

Previous approaches to solving this problem are discussed in the following commonly owned patents, which are incorporated by reference: U.S. Pat. No. 5,832,035, issued Nov. 3, 1998 to Fullerton, and U.S. Pat. No. 5,677,927, issued Oct. 14, 1997, to Fullerton, et al.

Another approach is disclosed in the commonly owned patent application titled "Method and System for Fast Acquisition of Ultra Wideband Signals," application Ser. No. 09/538,292, filed Mar. 29, 2000, and incorporated herein by reference. Each of these previous acquisition approaches requires the transmission, detection and integration of an entire coded pulse train per attempt to acquire the signal. Thus, the time required for each acquisition attempt is dependent upon the code period of the pulse train. If a code of length N is applied to a time layout consisting of N frames having N subframes each for a total of N×N subframes per code period of the pulse train. In such an arrangement, if 1-subframe grid spacing is used in a coarse acquisition search, N×N acquisition attempts are required to search the code period of the pulse train. In other words, N×N pulse trains transmitted in order to search across the entire code period with 1-subframe search resolution. For example, a train of 128 pulses specified by a code of length 128 and having a code period of 12.8 µs would require 12.8 µs per attempt, and a search across the entire code period with 1-subframe search resolution would require 128×128×12.8 µs, or approximately 0.21 seconds. Such acquisition times can significantly reduce the efficiency of many applications including wireless networks and precision location and tracking.

Moreover, it is well known that longer codes provide greater channelization, which is desirable for many applications. However, with these previous acquisition approaches, as the code length increases by a factor of M, the number of acquisition attempts required to search the code period increases by a factor of $M^2$. For example, doubling the code length quadruples the search time. If the code length triples, the search time increases by a factor of nine, and so on. Accordingly, the time required for these previous acquisition approaches to acquire a signal can be greater than is desired in applications requiring long codes.

Hence, there exists a need in the art for more efficiently acquiring an impulse radio signal. In particular, there exists a need in the art for more efficient acquisition of impulse radio signals specified by long codes.

SUMMARY OF THE INVENTION

In light of the above considerations, a method of synchronizing impulse radios is needed which is faster than methods currently used. Furthermore, the method should ideally permit the lengthening of the code signal for channelization purposes without the undesirable increase in acquisition times associated with previous solutions.

The present method provides a fast acquisition of pulsed signals, and particularly signals from impulse radios, by first requiring the code signal in question is constructed such that each interval between each symbol is substantially unique relative to each other interval. Instead of detecting an entire code modulo, the system simply detects a first symbol in the received signal, and stores the relative time at which the symbol was detected. The system then detects a second symbol and stores the time at which it was detected. The interval between the two symbols is calculated. The resultant value is compared to a look-up table of the symbol-to-symbol intervals and the two detected symbols can be identified. Identification of these two symbols accurately determines the timing of the code signal and allows the receiver to be synchronized with the timing of the code signal.

In the case of multipath signals, more than 1 pulse may be found when attempting the detection of a symbol. In this case, an ambiguity may result when the system attempts to determine which symbols have been detected. Performing additional detection operations and calculating the interval in terms of subframes between the subsequently detected symbols may resolve the ambiguity.

The preferred embodiment contemplates that incoming pulses will likely be a misaligned in time with respect to the impulse receiver's initiation of detection at any given time. The general method detects pulses misaligned by more than the duration of a subframe. Misalignments less than the duration of a subframe may yet be detected by iteratively varying the initiation of detection by some fraction of the duration of the subframe. This operation may be performed by sampling a given subframe and then delaying initiation or preengaging initiation of detection in the direction of greatest signal strength, and iteratively repeating these shifts until an acceptable signal-to-noise threshold is achieved.

In a distinct embodiment, an alphabet of symbols is created such that a symbol is a frame of time divided into subframes with a pulse occurring in one of the subframes. There can be no more than one pulse in any frame and no pulse occurs in corresponding subframes in any other frame in the code period, or code modulo. Symbols are arranged in the code signal such that the interval between symbol pulses, measured in subframes, is substantially unique within a set of the code signal symbol-to-symbol intervals. To prevent a receiver using time attempting to lock on unintended signals, one embodiment could require that each set of communicating transmitters and receivers use a unique code length.

It is to be understood that both the foregoing general description and the following detailed description are exemplary and explanatory and are intended to provide further explanation of the invention as claimed.

Other objects and advantages will become apparent during the following description of the presently preferred embodiment of the invention taken in conjunction with the drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIGS. 4A–4E illustrate five modulation techniques to include: Early-Late Modulation; One of Many Modulation; Flip Modulation; Quad Flip Modulation; and Vector Modulation;

FIG. 5B depicts a typical geometrical configuration giving rise to multipath received signals;

FIG. 5C illustrates exemplary multipath signals in the time domain;

FIG. 6 illustrates a representative impulse radio transmitter functional diagram;

FIG. 7 illustrates a representative impulse radio receiver functional diagram;

DETAILED DESCRIPTION OF THE EMBODIMENTS

Overview of the Invention

Figure 1B:
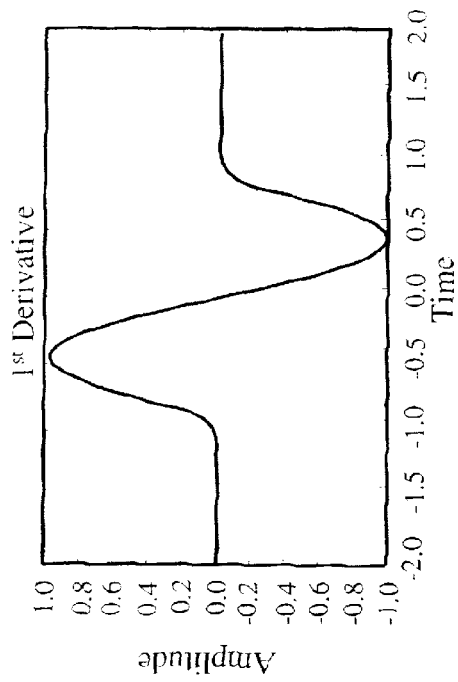
FIG. 1B illustrates the frequency domain amplitude of the Gaussian Monocycle of FIG. 1A.
Figure 1D:
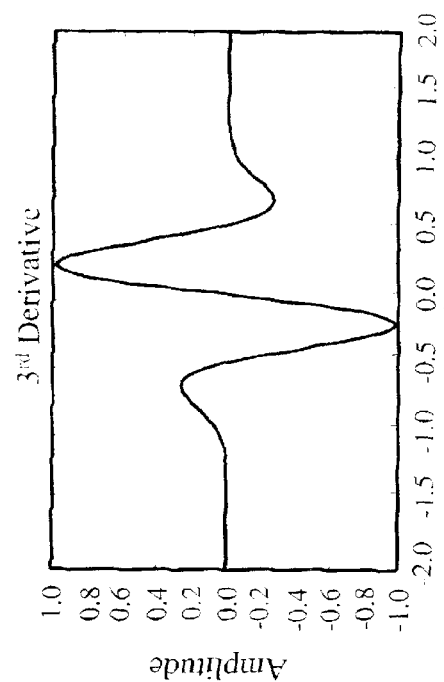
FIG. 1D represents the third derivative of the Gaussian Monocycle of FIG. 1A.
Figure 1A:
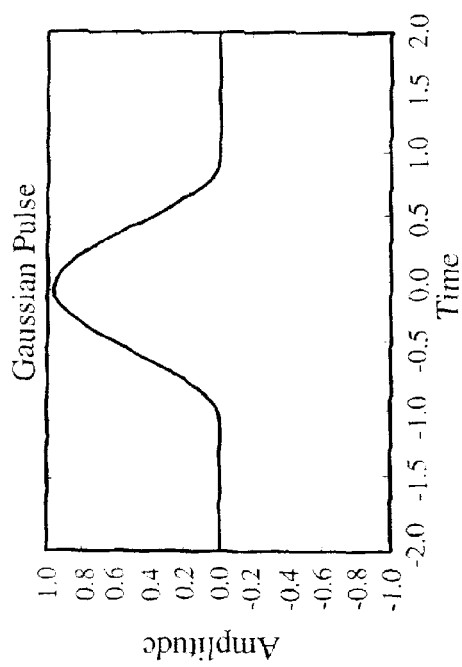
FIG. 1A illustrates a representative Gaussian Monocycle waveform in the time domain.
Figure 1C:
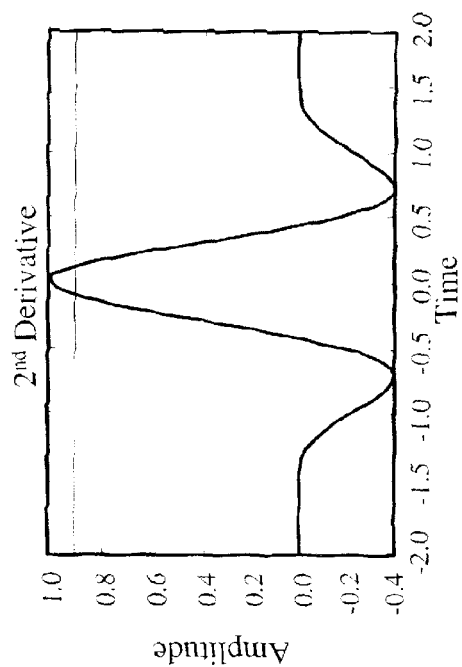
FIG. 1C represents the second derivative of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Technology Overview

Recent advances in communications technology have enabled ultra wideband technology (UWB) or impulse radio communications systems "impulse radio". To better understand the benefits of impulse radio to the present invention, the following review of impulse radio follows. Impulse radio has been described in a series of patents, including U.S. Pat. Nos. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents includes U.S. Pat. Nos. 5,677,927 (issued Oct. 14, 1997), U.S. Pat. No. 5,687,169 (issued Nov. 11, 1997), U.S. Pat. No. 5,764,696 (issued Jun. 9, 1998), and U.S. Pat. No. 5,832,035 (issued Nov. 3, 1998) to Fullerton et al.

Uses of impulse radio systems are described in U.S. patent application Ser. No. 09/332,502, titled, "System and Method for Intrusion Detection using a Time Domain Radar Array" and U.S. patent application Ser. No. 09/332,503, titled, "Wide Area Time Domain Radar Array" both filed on Jun. 14, 1999 both of which are assigned to the assignee of the present invention. The above patent documents are incorporated herein by reference.

This section provides an overview of impulse radio technology and relevant aspects of communications theory. It is provided to assist the reader with understanding the present invention and should not be used to limit the scope of the present invention. It should be understood that the terminology 'impulse radio' is used primarily for historical convenience and that the terminology can be generally interchanged with the terminology 'impulse communications system, ultra-wideband system, or ultra-wideband communication systems'. Furthermore, it should be understood that the described impulse radio technology is generally applicable to various other impulse system applications including but not limited to impulse radar systems and impulse positioning systems. Accordingly, the terminology 'impulse radio' can be generally interchanged with the terminology 'impulse transmission system and impulse reception system.'

Impulse radio refers to a radio system based on short, low duty-cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Many waveforms having very broad, or wide, spectral bandwidth approximate a Gaussian shape to a useful degree.

Impulse radio can use many types of modulation, including amplitude modulation, phase modulation, frequency modulation, time-shift modulation (also referred to as pulse-position modulation or pulse-interval modulation) and M-ary versions of these. In this document, the time-shift modulation method is often used as an illustrative example. However, someone skilled in the art will recognize that alternative modulation approaches may, in some instances, be used instead of or in combination with the time-shift modulation approach.

In impulse radio communications, inter-pulse spacing may be held constant or may be varied on a pulse-by-pulse basis by information, a code, or both. Generally, conventional spread spectrum systems employ codes to spread the normally narrow band information signal over a relatively wide band of frequencies. A conventional spread spectrum receiver correlates these signals to retrieve the original information signal. In impulse radio communications, codes are not typically used for energy spreading because the monocycle pulses themselves have an inherently wide bandwidth. Codes are more commonly used for channelization, energy smoothing in the frequency domain, resistance to interference, and reducing the interference potential to nearby receivers. Such codes are commonly referred to as time-hopping codes or pseudo-noise (PN) codes since their use typically causes inter-pulse spacing to have a seemingly random nature. PN codes may be generated by techniques other than pseudorandom code generation. Additionally, pulse trains having constant, or uniform, pulse spacing are commonly referred to as uncoded pulse trains. A pulse train with uniform pulse spacing, however, may be described by a code that specifies non-temporal, i.e., non-time related, pulse characteristics.

In impulse radio communications utilizing time-shift modulation, information comprising one or more bits of data typically time-position modulates a sequence of pulses. This yields a modulated, coded timing signal that comprises a train of pulses from which a typical impulse radio receiver employing the same code may demodulate and, if necessary, coherently integrate pulses to recover the transmitted information.

The impulse radio receiver is typically a direct conversion receiver with a cross correlator front-end that coherently converts an electromagnetic pulse train of monocycle pulses to a baseband signal in a single stage. The baseband signal is the basic information signal for the impulse radio communications system. A subcarrier may also be included with the baseband signal to reduce the effects of amplifier drift and low frequency noise. Typically, the subcarrier alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in more detail in U.S. Pat. No. 5,677,927 to Fullerton et al.

Waveforms

Figure 1E:
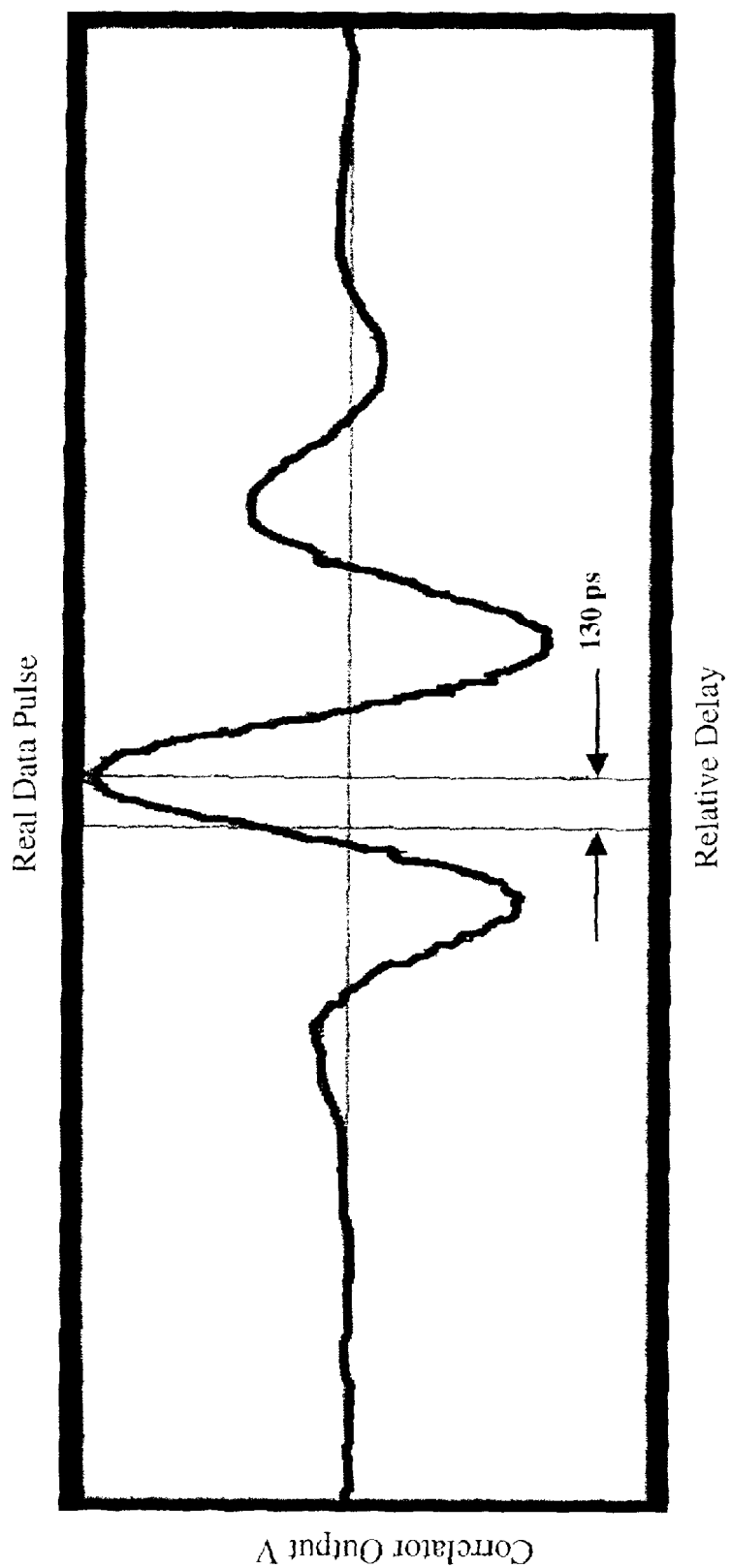
FIG. 1E represents the Correlator Output vs. the Relative Delay in a real data pulse.

Impulse transmission systems are based on short, low duty-cycle pulses. Different pulse waveforms, or pulse types, may be employed to accommodate requirements of various applications. Typical pulse types include a Gaussian pulse, pulse doublet (also referred to as a Gaussian monocycle), pulse triplet, and pulse quadlet as depicted in FIGS. 1A through 1D, respectively. An actual received waveform that closely resembles the theoretical pulse quadlet is shown in FIG. 1E. A pulse type may also be a wavelet set produced by combining two or more pulse waveforms (e.g., a doublet/triplet wavelet set). These different pulse types may be produced by methods described in the patent documents referenced above or by other methods, as persons skilled in the art would understand.

For analysis purposes, it is convenient to model pulse waveforms in an ideal manner. For example, the transmitted waveform produced by supplying a step function into an ultra-wideband antenna may be modeled as a Gaussian monocycle. A Gaussian monocycle (normalized to a peak value of 1) may be described by:

$$f_{mono}(t) = \sqrt{e}\left(\frac{t}{\sigma}\right)e^{\frac{-t^2}{2\sigma^2}}$$

where σ is a time scaling parameter, t is time, and e is the natural logarithm base.

Figure 1F:
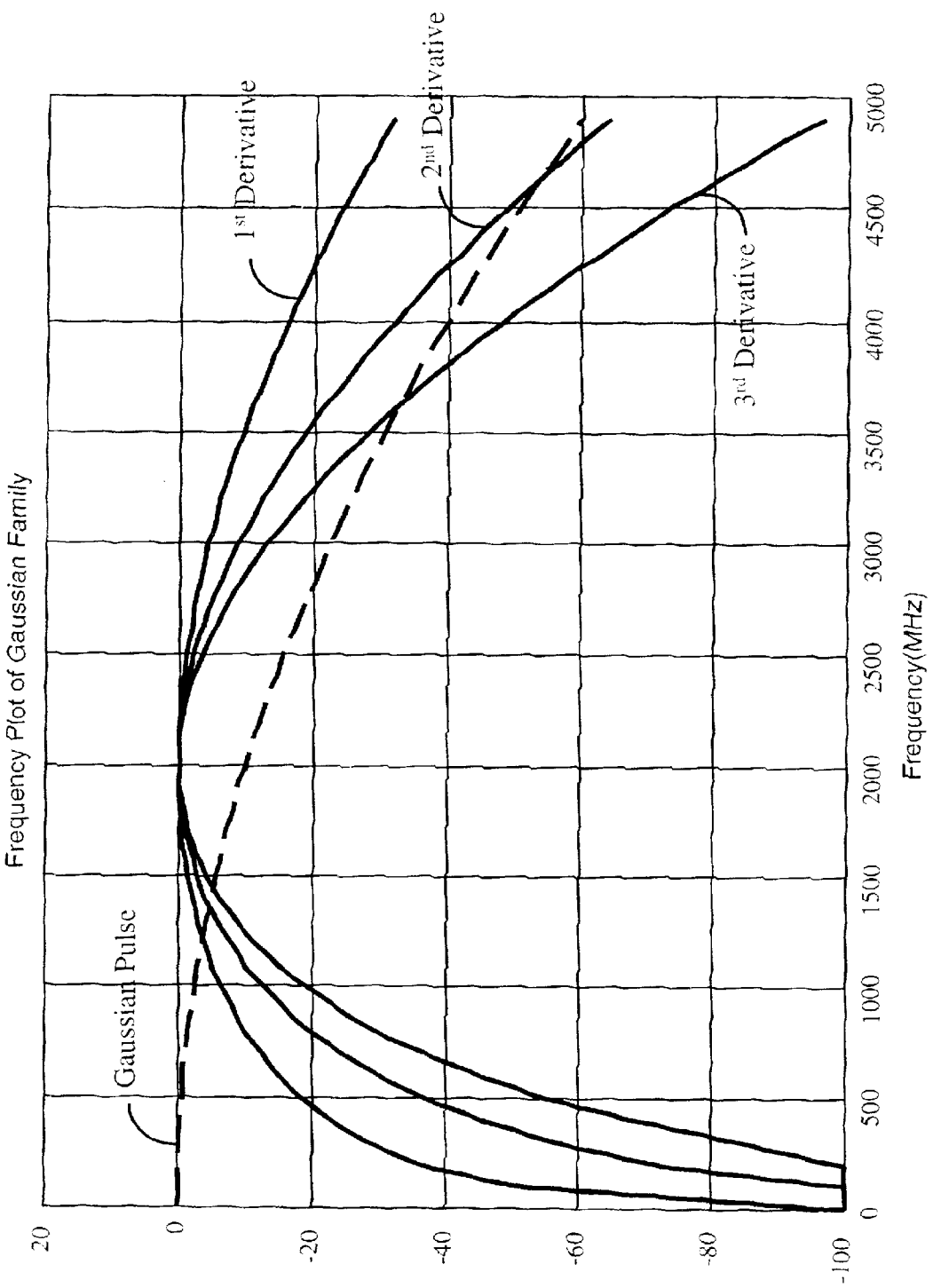
FIG. 1F depicts the frequency plot of the Gaussian family of the Gaussian Pulse and the first, second, and third derivative.

The power special density of the Gaussian monocycle is shown in FIG. 1F, along with spectrums for the Gaussian pulse, triplet, and quadlet. The corresponding equation for the Gaussian monocycle is:

$$F_{mono}(f) = (2\pi)^{\frac{3}{2}}\sigma f e^{-2(\pi\sigma f)^2}$$

The center frequency ($f_c$), or frequency of peak spectral density, of the Gaussian monocycle is:

$$f_c = \frac{1}{2\pi\sigma}$$

It should be noted that the output of an ultra-wideband antenna is essentially equal to the derivative of its input. Accordingly, since the pulse doublet, pulse triplet, and pulse quadlet are the first, second, and third derivatives of the Gaussian pulse, in an ideal model, an antenna receiving a Gaussian pulse will transmit a Gaussian monocycle and an antenna receiving a Gaussian monocycle will provide a pulse triplet.

Pulse Trains

Figure 2A:
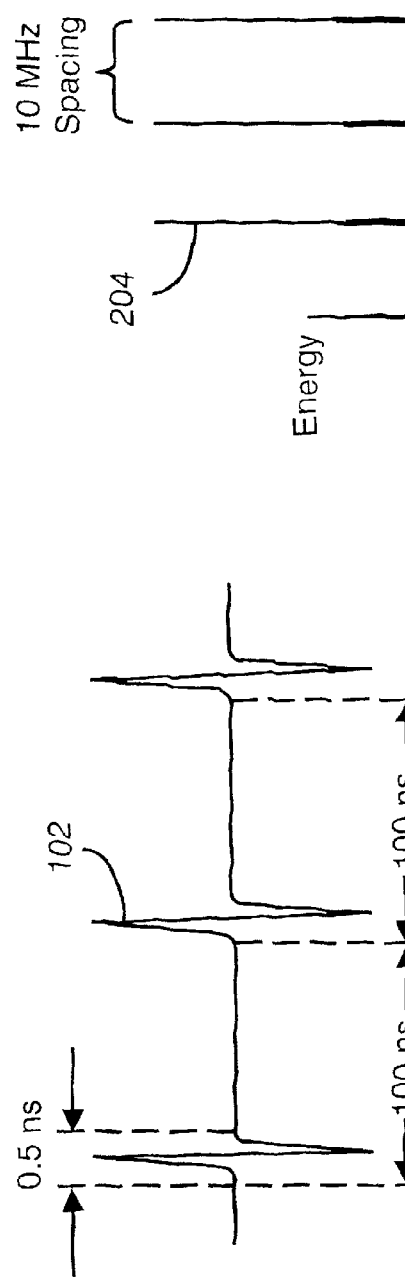
FIG. 2A illustrates a pulse train comprising pulses as in FIG. 1A.
Figure 2B:
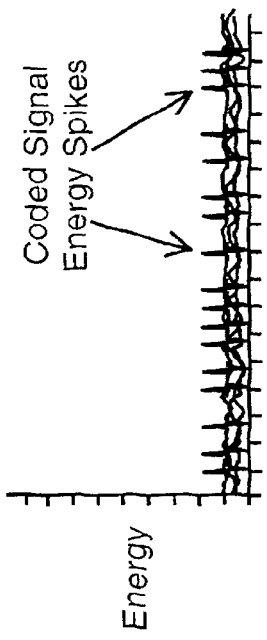
FIG. 2B illustrates the frequency domain amplitude of the waveform of FIG. 2A.

Impulse transmission systems may communicate one or more data bits with a single pulse; however, typically each data bit is communicated using a sequence of pulses, known as a pulse train. As described in detail in the following example system, the impulse radio transmitter produces and outputs a train of pulses for each bit of information. FIGS. 2A and 2B are illustrations of the output of a typical 10 megapulses per second (Mpps) system with uncoded, unmodulated pulses, each having a width of 0.5 nanoseconds (ns). FIG. 2A shows a time domain representation of the pulse train output. FIG. 2B illustrates that the result of the pulse train in the frequency domain is to produce a spectrum comprising a set of comb lines spaced at the frequency of the 10 Mpps pulse repetition rate. When the full spectrum is shown, as in FIG. 2C, the envelope of the comb line spectrum corresponds to the curve of the single Gaussian monocycle spectrum in FIG. 1F. For this simple uncoded case, the power of the pulse train is spread among roughly two hundred comb lines. Each comb line thus has a small fraction of the total power and presents much less of an interference problem to a receiver sharing the band. It can also be observed from FIG. 2A that impulse transmission systems typically have very low average duty cycles, resulting in average power lower than peak power. The duty cycle of the signal in FIG. 2A is 0.5%, based on a 0.5 ns pulse duration in a 100 ns interval.

The signal of an uncoded, unmodulated pulse train may be expressed:

$$s(t) = (-1)^f a \sum_j \omega(ct - jT_f, b)$$

where j is the index of a pulse within a pulse train, $(-1)^f$ is polarity (+/−), a is pulse amplitude, b is pulse type, c is pulse width, ω(t, b) is the normalized pulse waveform, and $T_f$ is pulse repetition time.

The energy spectrum of a pulse train signal over a frequency bandwidth of interest may be determined by summing the phasors of the pulses at each frequency, using the following equation:

$$A(\omega) = \left|\sum_{i=1}^{n} \frac{e^{j\Delta t}}{n}\right|$$

where A(ω) is the amplitude of the spectral response at a given frequency, ω is the frequency being analyzed (2πf), Δt is the relative time delay of each pulse from the start of time period, and n is the total number of pulses in the pulse train.

A pulse train can also be characterized by its autocorrelation and cross-correlation properties. Autocorrelation properties pertain to the number of pulse coincidences (i.e., simultaneous arrival of pulses) that occur when a pulse train is correlated against an instance of itself that is offset in time. Of primary importance is the ratio of the number of pulses in the pulse train to the maximum number of coincidences that occur for any time offset across the period of the pulse train. This ratio is commonly referred to as the main-lobe-to-side-lobe ratio, where the greater the ratio, the easier it is to acquire and track a signal.

Cross-correlation properties involve the potential for pulses from two different signals simultaneously arriving, or coinciding, at a receiver. Of primary importance are the maximum and average numbers of pulse coincidences that may occur between two pulse trains. As the number of coincidences increases, the propensity for data errors increases. Accordingly, pulse train cross-correlation properties are used in determining channelization capabilities of impulse transmission systems (i.e., the ability to simultaneously operate within close proximity).

Coding

Figure 2D:
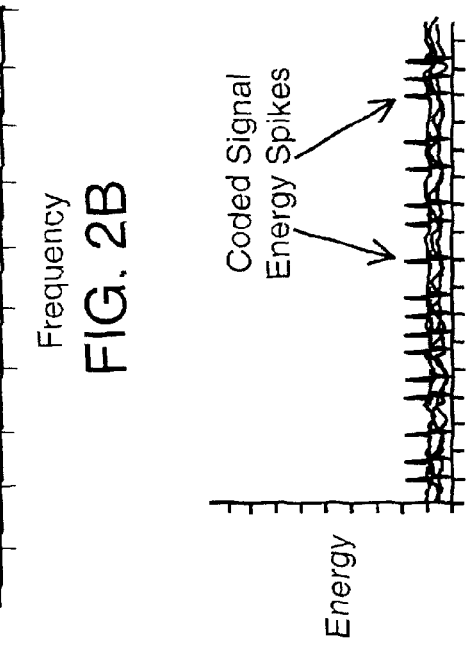
FIG. 2D is a plot of the Frequency vs. Energy Plot and points out the coded signal energy spikes.
Figure 2C:
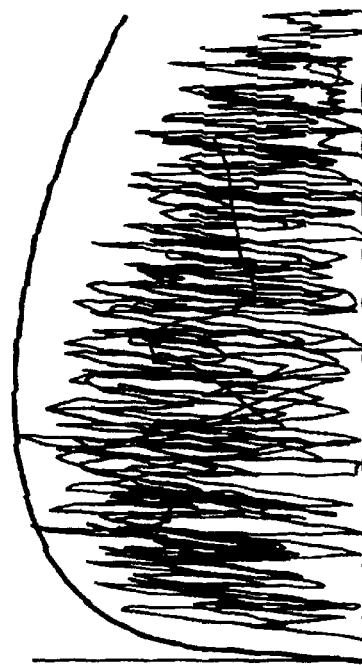
FIG. 2C illustrates the pulse train spectrum.

Specialized coding techniques can be employed to specify temporal and/or non-temporal pulse characteristics to produce a pulse train having certain spectral and/or correlation properties. For example, by employing a PN code to vary inter-pulse spacing, the energy in the comb lines presented in FIG. 2B can be distributed to other frequencies as depicted in FIG. 2D, thereby decreasing the peak spectral density within a bandwidth of interest. Note that the spectrum retains certain properties that depend on the specific (temporal) PN code used. Spectral properties can be similarly affected by using non-temporal coding (e.g., inverting certain pulses).

Figure 3:
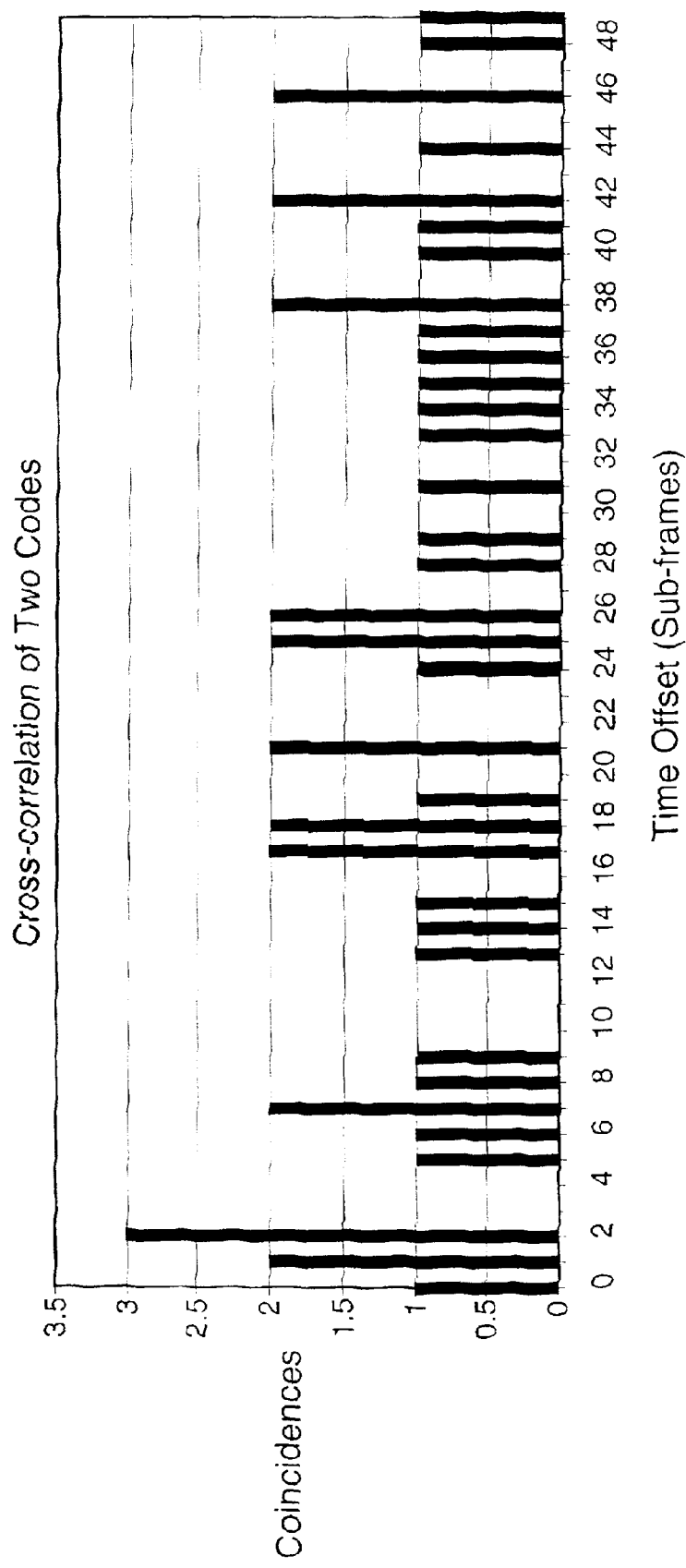
FIG. 3 illustrates the cross-correlation of two codes graphically as Coincidences vs. Time Offset.

Coding provides a method of establishing independent communication channels. Specifically, families of codes can be designed such that the number of pulse coincidences between pulse trains produced by any two codes will be minimal. For example, FIG. 3 depicts cross-correlation properties of two codes that have no more than four coincidences for any time offset. Generally, keeping the number of pulse collisions minimal represents a substantial attenuation of the unwanted signal.

Coding can also be used to facilitate signal acquisition. For example, coding techniques can be used to produce pulse trains with a desirable main-lobe-to-side-lobe ratio. In addition, coding can be used to reduce acquisition algorithm search space.

Coding methods for specifying temporal and non-temporal pulse characteristics are described in commonly owned, co-pending applications titled "A Method and Apparatus for Positioning Pulses in Time," application Ser. No. 09/592,249, and "A Method for Specifying Non-Temporal Pulse Characteristics," application Ser. No. 09/592,250, both filed Jun. 12, 2000, and both of which are incorporated herein by reference.

Typically, a code consists of a number of code elements having integer or floating-point values. A code element value may specify a single pulse characteristic or may be subdivided into multiple components, each specifying a different pulse characteristic. Code element or code component values typically map to a pulse characteristic value layout that may be fixed or non-fixed and may involve value ranges, discrete values, or a combination of value ranges and discrete values. A value range layout specifies a range of values that is divided into components that are each subdivided into subcomponents, which can be further subdivided, as desired. In contrast, a discrete value layout involves uniformly or non-uniformly distributed discrete values. A non-fixed layout (also referred to as a delta layout) involves delta values relative to some reference value. Fixed and non-fixed layouts, and approaches for mapping code element/component values, are described in co-owned, co-pending applications, titled "Method for Specifying Pulse Characteristics using Codes," application Ser. No. 09/592,290 and "A Method and Apparatus for Mapping Pulses to a Non-Fixed Layout," application Ser. No. 09/591,691, both filed on Jun. 12, 2000, both of which are incorporated herein by reference.

A fixed or non-fixed characteristic value layout may include a non-allowable region within which a pulse characteristic value is disallowed. A method for specifying non-allowable regions is described in co-owned, co-pending application titled "A Method for Specifying Non-Allowable Pulse Characteristics," application Ser. No. 09/592,289, filed Jun. 12, 2000, and incorporated herein by reference. A related method that conditionally positions pulses depending on whether code elements map to non-allowable regions is described in co-owned, co-pending application, titled "A Method and Apparatus for Positioning Pulses Using a Layout having Non-Allowable Regions," application Ser. No. 09/592,248 filed Jun. 12, 2000, and incorporated herein by reference.

The signal of a coded pulse train can be generally expressed by:

$$s_{tr}^{(k)}(t) = \sum_{j} (-1)^{f_j^{(k)}} a_j^{(k)} \omega(c_j^{(k)} t - T_j^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t, b_j^{(k)})$ are the coded polarity, pulse type, pulse width, and normalized pulse waveform of the jth pulse of the kth transmitter, and $T_j^{(k)}$ is the coded time shift of the jth pulse of the kth transmitter. Note: When a given non-temporal characteristic does not vary (i.e., remains constant for all pulses), it becomes a constant in front of the summation sign.

Various numerical code generation methods can be employed to produce codes having certain correlation and spectral properties. Such codes typically fall into one of two categories: designed codes and pseudorandom codes. A designed code may be generated using a quadratic congruential, hyperbolic congruential, linear congruential, Costas array, or other such numerical code generation technique designed to generate codes having certain correlation properties. A pseudorandom code may be generated using a computer's random number generator, binary shift-register(s) mapped to binary words, a chaotic code generation scheme, or the like. Such 'random-like' codes are attractive for certain applications since they tend to spread spectral energy over multiple frequencies while having 'good enough' correlation properties, whereas designed codes may have superior correlation properties but possess less suitable spectral properties. Detailed descriptions of numerical code generation techniques are included in a co-owned, co-pending patent application titled "A Method and Apparatus for Positioning Pulses in Time," application Ser. No. 09/592,248, filed Jun. 12, 2000, and incorporated herein by reference.

It may be necessary to apply predefined criteria to determine whether a generated code, code family, or a subset of a code is acceptable for use with a given UWB application. Criteria may include correlation properties, spectral properties, code length, non-allowable regions, number of code family members, or other pulse characteristics. A method for applying predefined criteria to codes is described in co-owned, co-pending application, titled "A Method and Apparatus for Specifying Pulse Characteristics using a Code that Satisfies Predefined Criteria," application Ser. No. 09/592,288, filed Jun. 12, 2000, and incorporated herein by reference.

In some applications, it may be desirable to employ a combination of codes. Codes may be combined sequentially, nested, or sequentially nested, and code combinations may be repeated. Sequential code combinations typically involve switching from one code to the next after the occurrence of some event and may also be used to support multicast communications. Nested code combinations may be employed to produce pulse trains having desirable correlation and spectral properties. For example, a designed code may be used to specify value range components within a layout and a nested pseudorandom code may be used to randomly position pulses within the value range components. With this approach, correlation properties of the designed code are maintained since the pulse positions specified by the nested code reside within the value range components specified by the designed code, while the random positioning of the pulses within the components results in particular spectral properties. A method for applying code combinations is described in co-owned, co-pending application, titled "A Method and Apparatus for Applying Codes Having Pre-Defined Properties," application Ser. No. 09/591,690, filed Jun. 12, 2000, and incorporated herein by reference.

Modulation

Various aspects of a pulse waveform may be modulated to convey information and to further minimize structure in the resulting spectrum. Amplitude modulation, phase modulation, frequency modulation, time-shift modulation and M-ary versions of these were proposed in U.S. Pat. No. 5,677,927 to Fullerton et al., previously incorporated by reference. Time-shift modulation can be described as shifting the position of a pulse either forward or backward in time relative to a nominal coded (or uncoded) time position in response to an information signal. Thus, each pulse in a train of pulses is typically delayed a different amount from its respective time base clock position by an individual code delay amount plus a modulation time shift. This modulation time shift is normally very small relative to the code shift. In a 10 Mpps system with a center frequency of 2 GHz, for example, the code may command pulse position variations over a range of 100 ns, whereas, the information modulation may shift the pulse position by 150 ps. This two-state 'early-late' form of time shift modulation is depicted in FIG. 4A.

A pulse train with conventional 'early-late' time-shift modulation can be expressed:

$$s_{tr}^{(k)}(t) = \sum_{j} (-1)^{f_j^{(i)}} a_j^{(j)} \omega(c_j^{(k)} t - T_j^{(k)} - \delta d_{\lfloor j/N_s \rfloor}^{(k)}, b_j^{(k)})$$

where k is the index of a transmitter, j is the index of a pulse within its pulse train, $(-1)f_j^{(k)}$, $a_j^{(k)}$, $b_j^{(k)}$, $c_j^{(k)}$, and $\omega(t,b_j^{(k)})$ are the coded polarity, pulse type, pulse width, and normalized pulse waveform of the jth pulse of the kth transmitter, $T_j^{(k)}$ is the coded time shift of the jth pulse of the kth transmitter, δ is the time shift added when the transmitted symbol is 1 (instead of 0), $d^{(k)}$ is the data (i.e., 0 or 1) transmitted by the kth transmitter, and $N_S$ is the number of pulses per symbol (e.g., bit). Similar expressions can be derived to accommodate other proposed forms of modulation.

An alternative form of time-shift modulation can be described as One-of-Many Position Modulation (OMPM). The OMPM approach, shown in FIG. 4B, involves shifting a pulse to one of N possible modulation positions about a nominal coded (or uncoded) time position in response to an information signal, where N represents the number of possible states. For example, if N were four (4), two data bits of information could be conveyed. For further details regarding OMPM, see "Apparatus, System and Method for One-of-Many Position Modulation in an Impulse Radio Communication System," Ser. No. 60/209,857, filed Jun. 7, 2000, assigned to the assignee of the present invention, and incorporated herein by reference.

An impulse radio communications system can employ flip modulation techniques to convey information. The simplest flip modulation technique involves transmission of a pulse or an inverted (or flipped) pulse to represent a data bit of information, as depicted in FIG. 4C. Flip modulation techniques may also be combined with time-shift modulation techniques to create two, four, or more different data states. One such flip with shift modulation technique is referred to as Quadrature Flip Time Modulation (QFTM). The QFTM approach is illustrated in FIG. 4D. Flip modulation techniques are further described in patent application titled "Apparatus, System and Method for Flip Modulation in an Impulse Radio Communication System," application Ser. No. 09/537,692, filed Mar. 29, 2000, assigned to the assignee of the present invention, and incorporated herein by reference.

Vector modulation techniques may also be used to convey information. Vector modulation includes the steps of generating and transmitting a series of time-modulated pulses, each pulse delayed by one of at least four pre-determined time delay periods and representative of at least two data bits of information, and receiving and demodulating the series of time-modulated pulses to estimate the data bits associated with each pulse. Vector modulation is shown in FIG. 4E. Vector modulation techniques are further described in patent application titled "Vector Modulation System and Method for Wideband Impulse Radio Communications," application Ser. No. 09/169,765, filed Dec. 9, 1999, assigned to the assignee of the present invention, and incorporated herein by reference.

Reception and Demodulation

Impulse radio systems operating within close proximity to each other may cause mutual interference. While coding minimizes mutual interference, the probability of pulse collisions increases as the number of coexisting impulse radio systems rises. Additionally, various other signals may be present that cause interference. Impulse radios can operate in the presence of mutual interference and other interfering signals, in part because they do not depend on receiving every transmitted pulse. Impulse radio receivers perform a correlating, synchronous receiving function (at the RF level) that uses statistical sampling and combining, or integration, of many pulses to recover transmitted information. Typically, 1 to 1000 or more pulses are integrated to yield a single data bit thus diminishing the impact of individual pulse collisions, where the number of pulses that must be integrated to successfully recover transmitted information depends on a number of variables including pulse rate, bit rate, range and interference levels.

Interference Resistance

Besides providing channelization and energy smoothing, coding makes impulse radios highly resistant to interference by enabling discrimination between intended impulse transmissions and interfering transmissions. This property is desirable since impulse radio systems must share the energy spectrum with conventional radio systems and with other impulse radio systems.

Figure 5A:
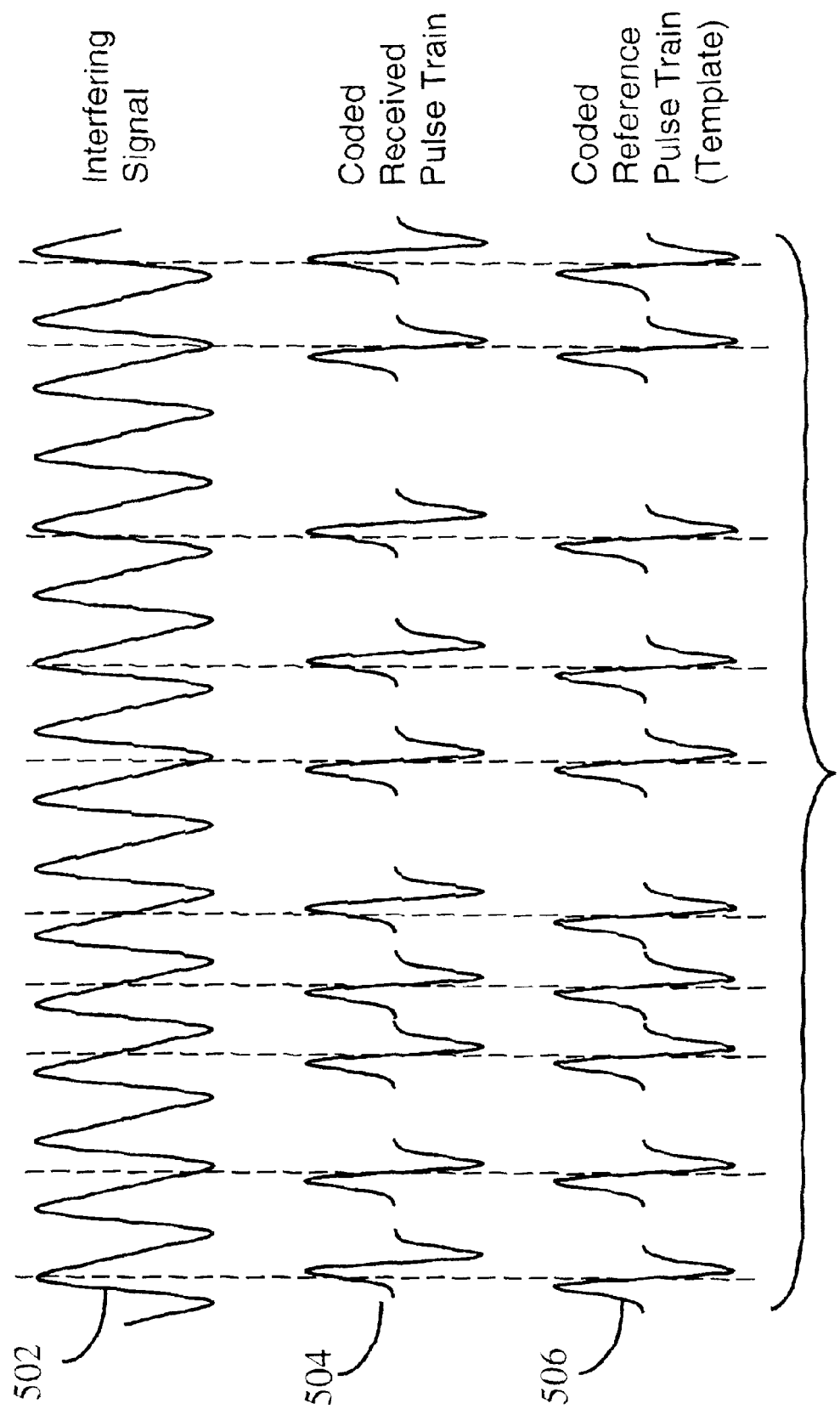
FIG. 5A illustrates representative signals of an interfering signal, a coded received pulse train and a coded reference pulse train.

FIG. 5A illustrates the result of a narrow band sinusoidal interference signal 502 overlaying an impulse radio signal 504. At the impulse radio receiver, the input to the cross correlation would include the narrow band signal 502 and the received ultrawide-band impulse radio signal 504. The input is sampled by the cross correlator using a template signal 506 positioned in accordance with a code. Without coding, the cross correlation would sample the interfering signal 502 with such regularity that the interfering signals could cause interference to the impulse radio receiver. However, when the transmitted impulse signal is coded and the impulse radio receiver template signal 506 is synchronized using the identical code, the receiver samples the interfering signals non-uniformly. The samples from the interfering signal add incoherently, increasing roughly according to the square root of the number of samples integrated. The impulse radio signal samples, however, add coherently, increasing directly according to the number of samples integrated. Thus, integrating over many pulses overcomes the impact of interference.

Processing Gain

Impulse radio systems have exceptional processing gain due to their wide spreading bandwidth. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 KHz information bandwidth and a 10 MHz channel bandwidth yields a processing gain of 1000, or 30 dB. However, far greater processing gains are achieved by impulse radio systems, where the same 10 KHz information bandwidth is spread across a much greater 2 GHz channel bandwidth, resulting in a theoretical processing gain of 200,000, or 53 dB.

Capacity

It can be shown theoretically, using signal-to-noise arguments, that thousands of simultaneous channels are available to an impulse radio system as a result of its exceptional processing gain.

The average output signal-to-noise ratio of the impulse radio may be calculated for randomly selected time-hopping codes as a function of the number of active users, $N_u$, as:

$$SNR_{out}(N_u) = \frac{(N_s A_1 m_p)^2}{\sigma_{rec}^2 + N_s \sigma_a^2 \sum_{k=2}^{N_u} A_k^2}$$

where $N_s$ is the number of pulses integrated per bit of information, $A_k$ models the attenuation of transmitter k's signal over the propagation path to the receiver, and $\sigma_{rec}^2$ is the variance of the receiver noise component at the pulse train integrator output. The monocycle waveform-dependent parameters $m_p$ and $\sigma_a^2$ are given by $$m_p = \int_{-\infty}^{\infty} \omega(t)[\omega(t) - \omega(t - \delta)] dt$$

and $$\sigma_a^2 = T_f^{-1} \int_{-\infty}^{\infty} \left[ \int_{-\infty}^{\infty} \omega(t-s) v(t) dt \right]^2 ds,$$

where $\omega(t)$ is the monocycle waveform, $v(t) = \omega(t) - \omega(t-\delta)$ is the template signal waveform, $\delta$ is the time shift between the monocycle waveform and the template signal waveform, $T_{ff}$ is the pulse repetition time, and s is signal.

Multipath and Propagation

One of the advantages of impulse radio is its resistance to multipath fading effects. Conventional narrow band systems are subject to multipath through the Rayleigh fading process, where the signals from many delayed reflections combine at the receiver antenna according to their seemingly random relative phases resulting in possible summation or possible cancellation, depending on the specific propagation to a given location. Multipath fading effects are most adverse where a direct path signal is weak relative to multipath signals, which represents the majority of the potential coverage area of a radio system. In a mobile system, received signal strength fluctuates due to the changing mix of multipath signals that vary as its position varies relative to fixed transmitters, mobile transmitters and signal-reflecting surfaces in the environment.

Impulse radios, however, can be substantially resistant to multipath effects. Impulses arriving from delayed multipath reflections typically arrive outside of the correlation time and, thus, may be ignored. This process is described in detail with reference to FIGS. 5B and 5C. FIG. 5B illustrates a typical multipath situation, such as in a building, where there are many reflectors 504B, 505B. In this figure, a transmitter 506B transmits a signal that propagates along three paths, the direct path 501B, path 1 502B, and path 2 503B, to a receiver 508B, where the multiple reflected signals are combined at the antenna. The direct path 501B, representing the straight-line distance between the transmitter and receiver, is the shortest. Path 1 502B represents a multipath reflection with a distance very close to that of the direct path. Path 2 503B represents a multipath reflection with a much longer distance. Also shown are elliptical (or, in space, ellipsoidal) traces that represent other possible locations for reflectors that would produce paths having the same distance and thus the same time delay.

FIG. 5C illustrates the received composite pulse waveform resulting from the three propagation paths 501B, 502B, and 503B shown in FIG. 5B. In this figure, the direct path signal 501B is shown as the first pulse signal received. The path 1 and path 2 signals 502B, 503B comprise the remaining multipath signals, or multipath response, as illustrated. The direct path signal is the reference signal and represents the shortest propagation time. The path 1 signal is delayed slightly and overlaps and enhances the signal strength at this delay value. The path 2 signal is delayed sufficiently that the waveform is completely separated from the direct path signal. Note that the reflected waves are reversed in polarity. If the correlator template signal is positioned such that it will sample the direct path signal, the path 2 signal will not be sampled and thus will produce no response. However, it can be seen that the path 1 signal has an effect on the reception of the direct path signal since a portion of it would also be sampled by the template signal. Generally, multipath signals delayed less than one quarter wave (one quarter wave is about 1.5 inches, or 3.5 cm at 2 GHz center frequency) may attenuate the direct path signal. This region is equivalent to the first Fresnel zone in narrow band systems. Impulse radio, however, has no further nulls in the higher Fresnel zones. This ability to avoid the highly variable attenuation from multipath gives impulse radio significant performance advantages.

Figure 5D:
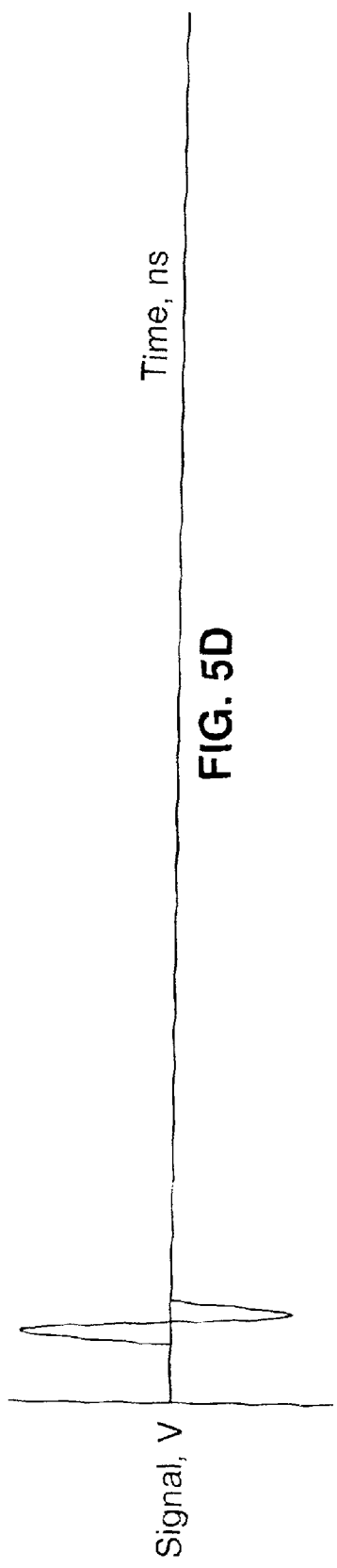
FIGS. 5D–5F illustrate a signal plot of various multipath environments.
Figure 5E:
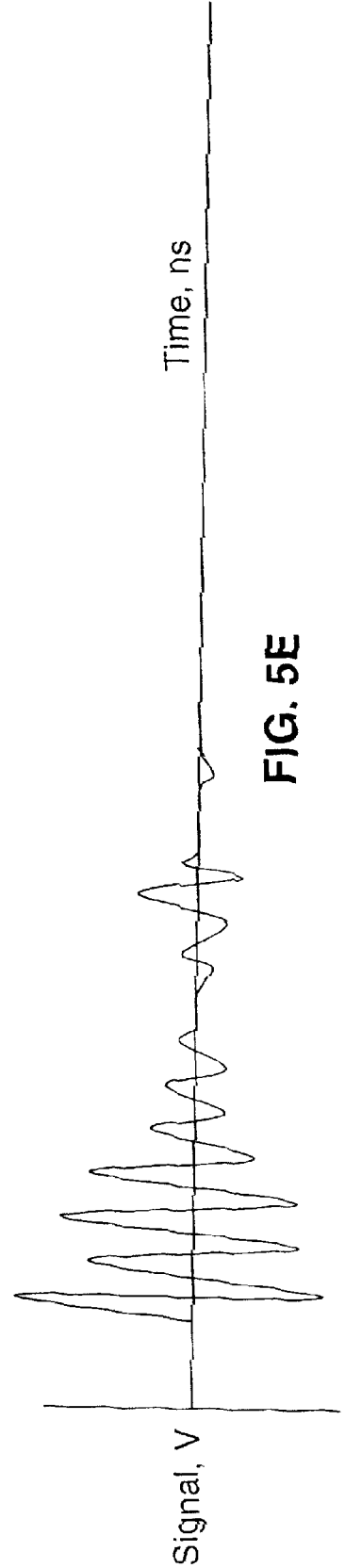
Figure 5F:
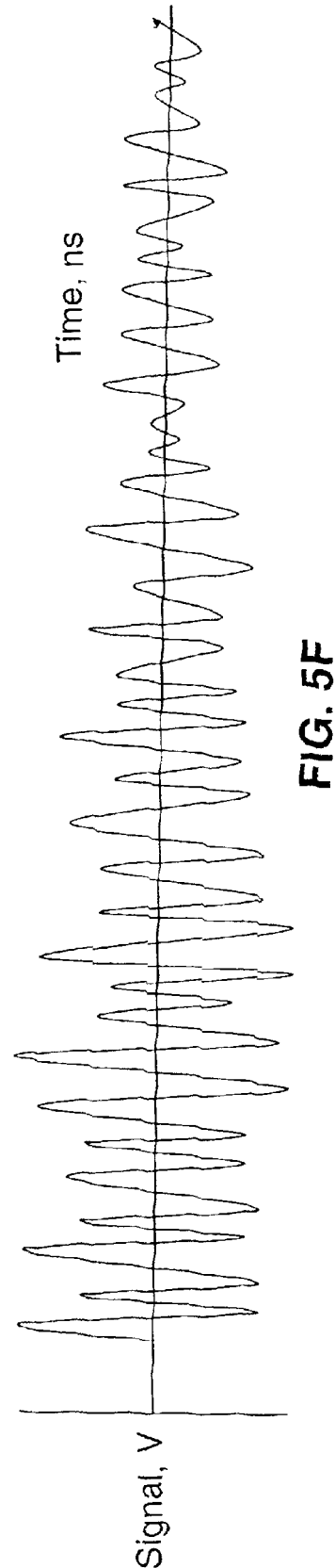

FIGS. 5D, 5E, and 5F represent the received signal from a TM-UWB transmitter in three different multipath environments. These figures are approximations of typical signal plots. FIG. 5D illustrates the received signal in a very low multipath environment. This may occur in a building where the receiver antenna is in the middle of a room and is a relatively short, distance, for example, one meter, from the transmitter. This may also represent signals received from a larger distance, such as 100 meters, in an open field where there are no objects to produce reflections. In this situation, the predominant pulse is the first received pulse and the multipath reflections are too weak to be significant. FIG. 5E illustrates an intermediate multipath environment. This approximates the response from one room to the next in a building. The amplitude of the direct path signal is less than in FIG. 5D and several reflected signals are of significant amplitude. FIG. 5F approximates the response in a severe multipath environment such as propagation through many rooms, from corner to corner in a building, within a metal cargo hold of a ship, within a metal truck trailer, or within an intermodal shipping container. In this scenario, the main path signal is weaker than in FIG. 5E. In this situation, the direct path signal power is small relative to the total signal power from the reflections.

Figure 5G:
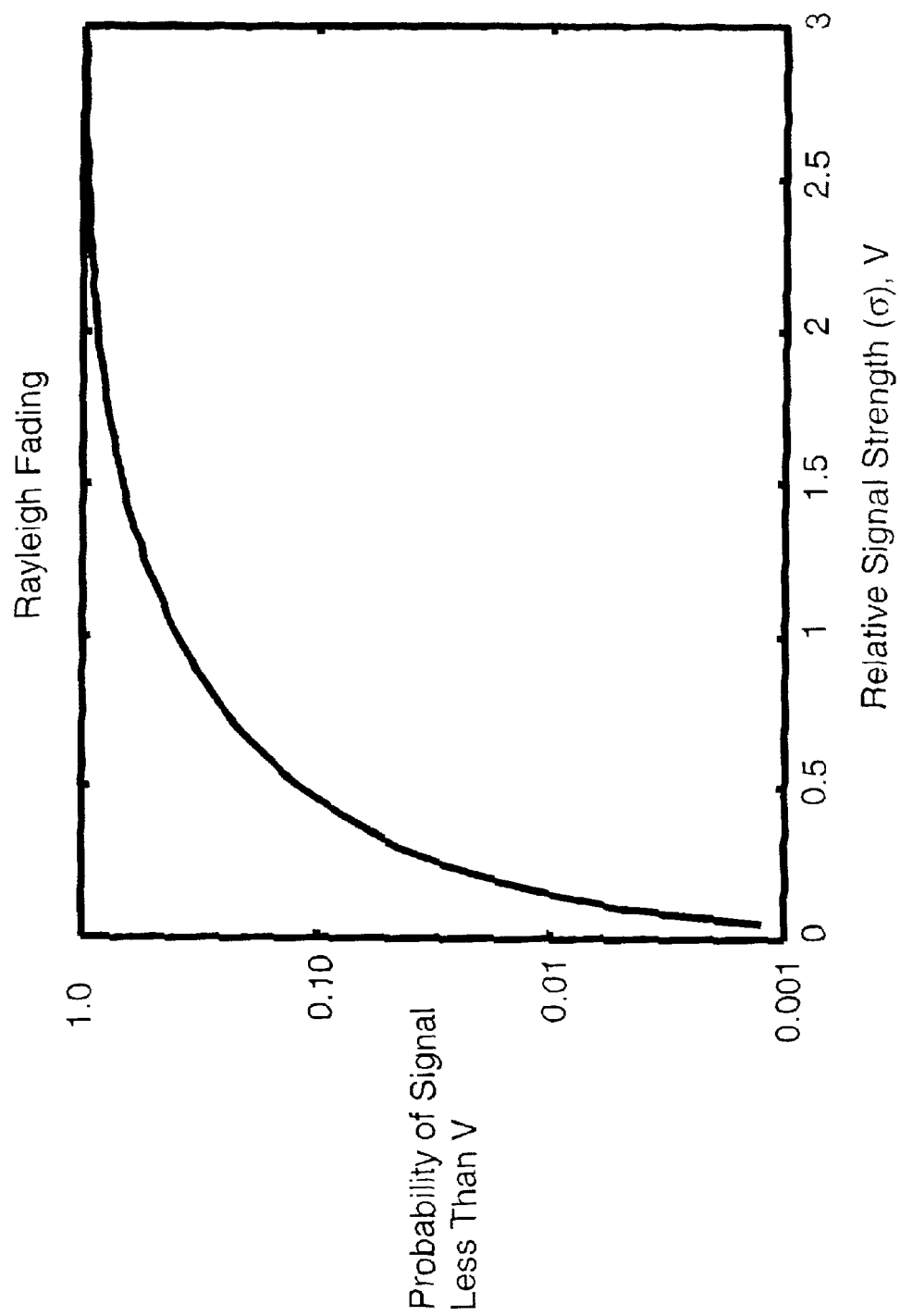
FIGS. 5G illustrates the Rayleigh fading curve associated with non-impulse radio transmissions in a multipath environment.

An impulse radio receiver can receive the signal and demodulate the information using either the direct path signal or any multipath signal peak having sufficient signal-to-noise ratio. Thus, the impulse radio receiver can select the strongest response from among the many arriving signals. In order for the multipath signals to cancel and produce a null at a given location, dozens of reflections would have to be cancelled simultaneously and precisely while blocking the direct path, which is a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal-to-noise performance.

Where the system of FIG. 5B is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{r}{\sigma^2} \exp\left(\frac{-r^2}{2\sigma^2}\right)$$

where r is the envelope amplitude of the combined multipath signals, and $\sigma(2)^{1/2}$ is the RMS power of the combined multipath signals. The Rayleigh distribution curve in FIG. 5G shows that 10% of the time, the signal is more than 10 dB attenuated. This suggests that 10 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5H:
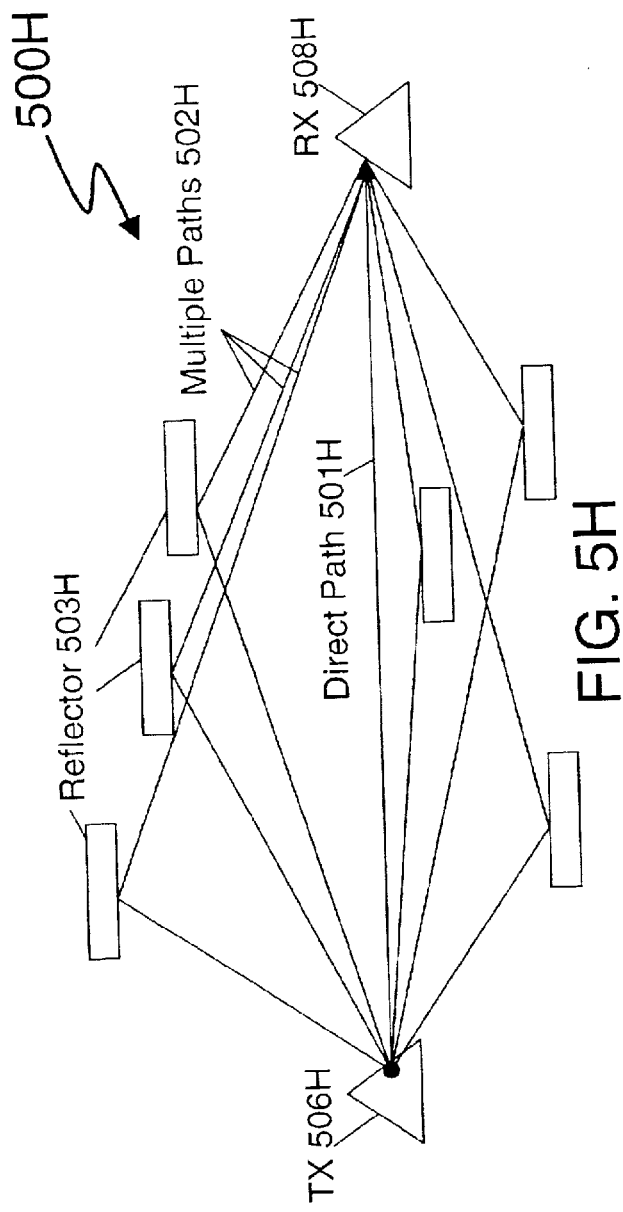
FIG. 5H illustrates a plurality of multipath with a plurality of reflectors from a transmitter to a receiver.
Figure 5I:
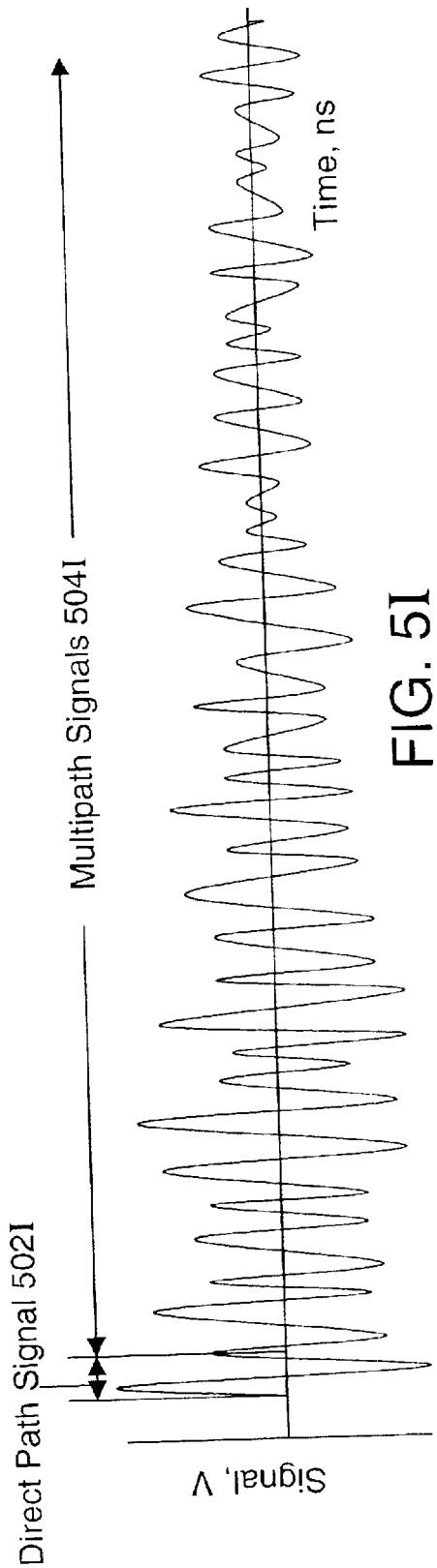
FIG. 5I graphically represents signal strength as volts vs. time in a direct path and multipath environment.

In a high multipath environment such as inside homes, offices, warehouses, automobiles, trailers, shipping containers, or outside in an urban canyon or other situations where the propagation is such that the received signal is primarily scattered energy, impulse radio systems can avoid the Rayleigh fading mechanism that limits performance of narrow band systems, as illustrated in FIGS. 5H and 5I. FIG. 5H depicts an impulse radio system in a high multipath environment 500H consisting of a transmitter 506H and a receiver 508H. A transmitted signal follows a direct path 501H and reflects off reflectors 503H via multiple paths 502H. FIG. 5I illustrates the combined signal received by the receiver 508H over time with the vertical axis being signal strength in volts and the horizontal axis representing time in nanoseconds. The direct path 501H results in the direct path signal 502I while the multiple paths 502H result in multipath signals 504I. In the same manner described earlier for FIGS. 5B and 5C, the direct path signal 502I is sampled, while the multipath signals 504I are not, resulting in Rayleigh fading avoidance.

Distance Measurement and Positioning

Impulse systems can measure distances to relatively fine resolution because of the absence of ambiguous cycles in the received waveform. Narrow band systems, on the other hand, are limited to the modulation envelope and cannot easily distinguish precisely which RF cycle is associated with each data bit because the cycle-to-cycle amplitude differences are so small they are masked by link or system noise. Since an impulse radio waveform has no multi-cycle ambiguity, it is possible to determine waveform position to less than a wavelength, potentially down to the noise floor of the system. This time position measurement can be used to measure propagation delay to determine link distance to a high degree of precision. For example, 30 ps of time transfer resolution corresponds to approximately centimeter distance resolution. See, for example, U.S. Pat. No. 6,133,876, issued Oct. 17, 2000, titled "System and Method for Position Determination by Impulse Radio," and U.S. Pat. No. 6,111,536, issued Aug. 29, 2000, titled "System and Method for Distance Measurement by Inphase and Quadrature Signals in a Radio System," both of which are incorporated herein by reference.

In addition to the methods articulated above, impulse radio technology along with Time Division Multiple Access algorithms and Time Domain packet radios can achieve geo-positioning capabilities in a radio network. This geo-positioning method is described in co-owned, co-pending application titled "System and Method for Person or Object Position Location Utilizing Impulse Radio," application Ser. No. 09/456,409, filed Dec. 8, 1999, and incorporated herein by reference.

Power Control

Power control systems comprise a first transceiver that transmits an impulse radio signal to a second transceiver. A power control update is calculated according to a performance measurement of the signal received at the second transceiver. The transmitter power of either transceiver, depending on the particular setup, is adjusted according to the power control update. Various performance measurements are employed to calculate a power control update, including bit error rate, signal-to-noise ratio, and received signal strength, used alone or in combination. Interference is thereby reduced, which may improve performance where multiple impulse radios are operating in close proximity and their transmissions interfere with one another. Reducing the transmitter power of each radio to a level that produces satisfactory reception increases the total number of radios that can operate in an area without saturation. Reducing transmitter power also increases transceiver efficiency.

For greater elaboration of impulse radio power control, see patent application titled "System and Method for Impulse Radio Power Control," application Ser. No. 09/332,501, filed Jun. 14, 1999, assigned to the assignee of the present invention, and incorporated herein by reference.

Mitigating Effects of Interference

A method for mitigating interference in impulse radio systems comprises the steps of conveying the message in packets, repeating conveyance of selected packets to make up a repeat package, and conveying the repeat package a plurality of times at a repeat period greater than twice the period of occurrence of the interference. The communication may convey a message from a proximate transmitter to a distal receiver, and receive a message by a proximate receiver from a distal transmitter. In such a system, the method comprises the steps of providing interference indications by the distal receiver to the proximate transmitter, using the interference indications to determine predicted noise periods, and operating the proximate transmitter to convey the message according to at least one of the following: (1) avoiding conveying the message during noise periods, (2) conveying the message at a higher power during noise periods, (3) increasing error detection coding in the message during noise periods, (4) re-transmitting the message following noise periods, (5) avoiding conveying the message when interference is greater than a first strength, (6) conveying the message at a higher power when the interference is greater than a second strength, (7) increasing error detection coding in the message when the interference is greater than a third strength, and (8) re-transmitting a portion of the message after interference has subsided to less than a predetermined strength.

For greater elaboration of mitigating interference in impulse radio systems, see the patent application titled "Method for Mitigating Effects of Interference in Impulse Radio Communication," application Ser. No. 09/587,033, filed Jun. 2, 1999, assigned to the assignee of the present invention, and incorporated herein by reference.

Moderating Interference in Equipment Control Applications

Yet another improvement to impulse radio includes moderating interference with impulse radio wireless control of an appliance. The control is affected by a controller remote from the appliance which transmits impulse radio digital control signals to the appliance. The control signals have a transmission power and a data rate. The method comprises the steps of establishing a maximum acceptable noise value for a parameter relating to interfering signals and a frequency range for measuring the interfering signals, measuring the parameter for the interference signals within the frequency range, and effecting an alteration of transmission of the control signals when the parameter exceeds the maximum acceptable noise value.

For greater elaboration of moderating interference while effecting impulse radio wireless control of equipment, see patent application titled "Method and Apparatus for Moderating Interference While Effecting Impulse Radio Wireless Control of Equipment," application Ser. No. 09/586,163, filed Jun. 2, 1999, and assigned to the assignee of the present invention, and incorporated herein by reference.

Exemplary Transceiver Implementation

Transmitter

An exemplary embodiment of an impulse radio transmitter 602 of an impulse radio communication system having an optional subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The control voltage to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614, together with an optional, internally generated subcarrier signal, and an information signal 616, to generate a modulated, coded timing signal 618.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger signal to generate output pulses. The output pulses are provided to a transmit antenna 624 via a transmission line 626 coupled thereto. The output pulses are converted into propagating electromagnetic pulses by the transmit antenna 624. The electromagnetic pulses are called the emitted signal, and propagate to an impulse radio receiver 702, such as shown in FIG. 7, through a propagation medium. In a preferred embodiment, the emitted signal is wide-band or ultrawide-band, approaching a monocycle pulse as in FIG. 1B. However, the emitted signal may be spectrally modified by filtering of the pulses, which may cause them to have more zero crossings (more cycles) in the time domain, requiring the radio receiver to use a similar waveform as the template signal for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710, via a receiver transmission line, coupled to the receive antenna 704. The cross correlation 710 produces a baseband output 712.

The receiver 702 also includes a precision timing generator 714, which receives a periodic timing signal 716 from a receiver time base 718. This time base 718 may be adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 preferably comprises a multiplier followed by a short term integrator to sum the multiplier product over the pulse interval.

The output of the correlator 710 is coupled to a subcarrier demodulator 732, which demodulates the subcarrier information signal from the optional subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to provide an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to position in time the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
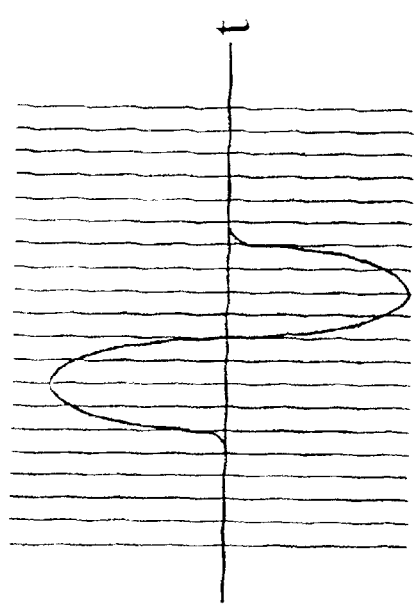
FIG. 8A illustrates a representative received pulse signal at the input to the correlator.
Figure 8B:
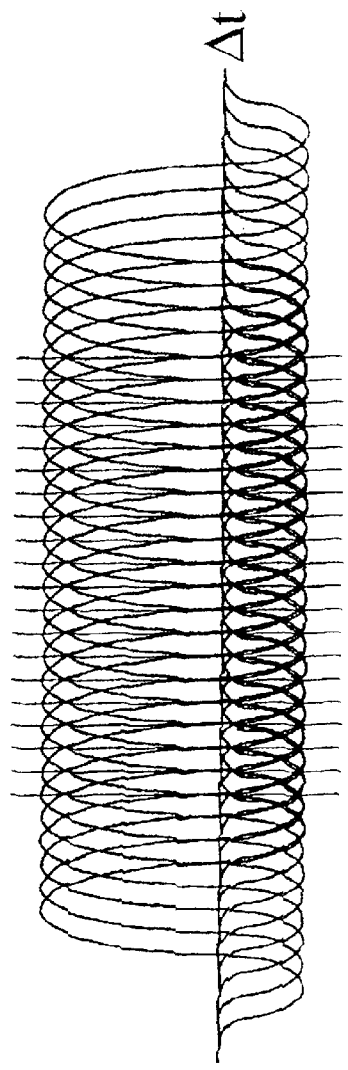
FIG. 8B illustrates a sequence of representative impulse signals in the correlation process.
Figure 8C:
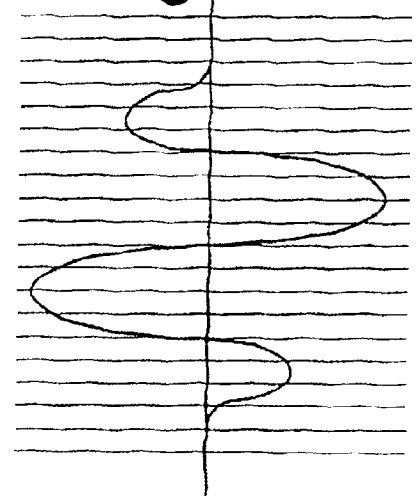
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the cross correlator for each of the time offsets of FIG. 8B. For any given pulse received, there is a corresponding point that is applicable on this graph. This is the point corresponding to the time offset of the template signal used to receive that pulse. Further examples and details of precision timing can be found described in U.S. Pat. No. 5,677,927, and commonly owned co-pending application application Ser. No. 09/146,524, filed Sep. 3, 1998, titled "Precision Timing Generator System and Method," both of which are incorporated herein by reference.

Because of the unique nature of impulse radio receivers, several modifications have been recently made to enhance system capabilities. Modifications include the utilization of multiple correlators to measure the impulse response of a channel to the maximum communications range of the system and to capture information on data symbol statistics . Further, multiple correlators enable rake pulse correlation techniques, more efficient acquisition and tracking implementations, various modulation schemes, and collection of time-calibrated pictures of received waveforms. For greater elaboration of multiple correlator techniques, see patent application titled "System and Method of using Multiple Correlator Receivers in an Impulse Radio System", application Ser. No. 09/537,264, filed Mar. 29, 2000, assigned to the assignee of the present invention, and incorporated herein by reference.

Methods to improve the speed at which a receiver can acquire and lock onto an incoming impulse radio signal have been developed. In one approach, a receiver includes an adjustable time base to output a sliding periodic timing signal having an adjustable repetition rate and a decode timing modulator to output a decode signal in response to the periodic timing signal. The impulse radio signal is cross-correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by one or more extra counts after each T pulses is reached in order to shift the code modulo for proper phase alignment of the periodic timing signal and the received impulse radio signal. This method is described in more detail in U.S. Pat. No. 5,832,035 to Fullerton, incorporated herein by reference.

In another approach, a receiver obtains a template pulse train and a received impulse radio signal. The receiver compares the template pulse train and the received impulse radio signal. The system performs a threshold check on the comparison result. If the comparison result passes the threshold check, the system locks on the received impulse radio signal. The system may also perform a quick check, a synchronization check, and/or a command check of the impulse radio signal. For greater elaboration of this approach, see the patent application titled "Method and System for Fast Acquisition of Ultra Wideband Signals," application Ser. No. 09/538,292, filed Mar. 29, 2000, assigned to the assignee of the present invention, and incorporated herein by reference.

A receiver has been developed that includes a baseband signal converter device and combines multiple converter circuits and an RF amplifier in a single integrated circuit package. For greater elaboration of this receiver, see the patent application titled "Baseband Signal Converter for a Wideband Impulse Radio Receiver," application Ser. No. 09/356,384, filed Jul. 16, 1999, assigned to the assignee of the present invention, and incorporated herein by reference.
Detailed Description of Fast Acquisition of Impulse Radio Signals The below-described method performs initial synchronization between two impulse radios, and will allow synchronization of impulse radio receivers in most cases in less than a few milliseconds, even in very low signal-to-noise situations. It will be clear to one of ordinary skill in the art that this method can be used for any system that uses time-coded, short-pulsed, or wavelet transmission methods. It is anticipated that this technique will apply to bursting of pulses, i.e., transmitting successive pulses within the decay period of the multipath signal, as well.

The method presumes a transmitted sequence of pulses constructed such that the timing of each pulse within the sequence represents a symbol. Relevant to this technique is the potential for the sequence to be timed such that each interval between adjacent symbols is substantially unique.

Figure 9:
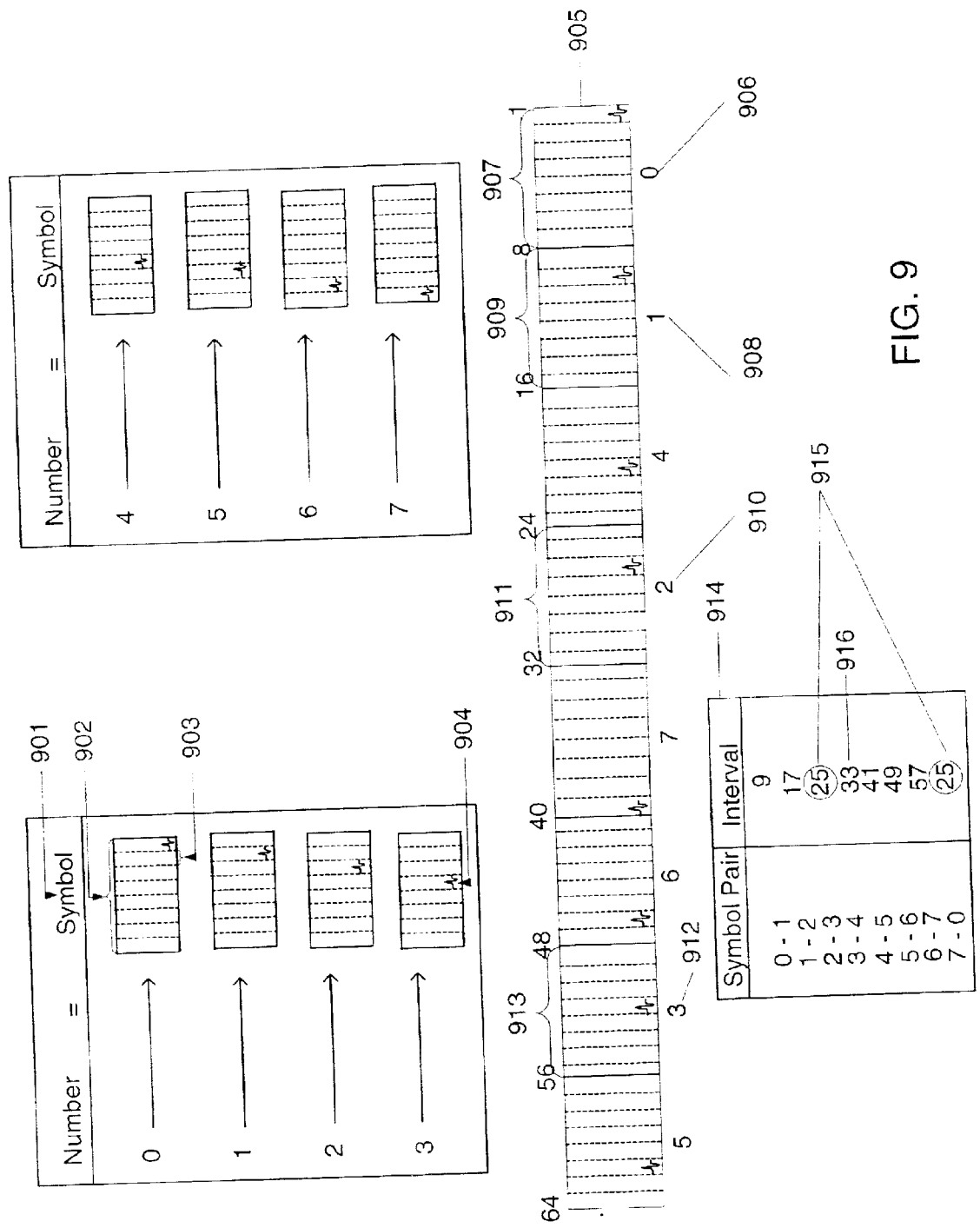
FIG. 9 illustrates an example alphabet of symbols and assembled code.

Those skilled in the art will recognize that there are many different code signal constructs that can be implemented in accordance with this requirement. One embodiment is set forth in an example shown in FIG. 9. FIG. 9 shows an alphabet of symbols 901 comprised of frames 902 which are divided into subframes 903. In this particular embodiment, the number of subframes is equal to the number of symbols in the alphabet. A symbol is thus defined as a pulse occurring in a subframe 904 and typically no pulse occurs in corresponding subframes in any other frame in the alphabet of symbols. Additionally, each symbol 901, and therefore each subframe 903, is used once and only once in the entire alphabet.

An example code signal 905 is thus assembled such that the intervals between adjacent symbols in the alphabet are unique, or at least substantially unique. The interval may be measured in terms of frames, subframes, or absolute time. However, attention should be directed to achieving sufficient granularity of measurement to ensure that inter-symbol intervals are indeed substantially unique. The code signal 905 may be assembled by placing the symbols using a trial-and-error method, or by some algorithmic technique. It is envisioned that use of quadratic congruential codes or hyperbolic congruential codes will likewise yield codes with unique inter-symbol spacing. The example code signal is assembled such that the $i^{th}$ symbol in the alphabet occurs according to the following function:

$$f(i) = \sum_{0}^{i} j \bmod N$$

where i is the symbol number and N is the code length in frames.

Thus, Symbol 0 906 appears in Frame 0 907, Symbol 1 908 occurs in Frame 1 909, Symbol 2 910 occurs in Frame 3 911, Symbol 3 912 occurs in Frame 6 913, and so on until the alphabet is exhausted. No symbol appears twice in the signal.

In this embodiment, because all of the symbols in the alphabet are used in the code signal, the alphabet defines the length of the code modulo. However, it should be noted that any length code could be used as long as the inter-symbol intervals remain substantially or completely unique. Additionally, in FIG. 9, a code length of 8 frames was used for example purposes only. Longer code lengths are preferred to provide improved channelization and prevent mutual interference, particularly in environments where multiple sets of transmitters and receivers are anticipated to operate. Typical code lengths are 128 symbols or some greater integer power of 2. However, the disclosed method may be practiced with code lengths that are not even multiples of 2.

Furthermore, for code lengths of $2^N$ symbols, codes may be assembled as described above such that the intervals will be unique in all but one case. As will be explained below, however, the possibility of a non-unique case will not decrease the utility of the method. It should be noted in the interval table 914, the interval 25 appears twice 915. It should be further noted that since the code repeats it is a wraparound code. Thus, for example, the interval may be measured from between Symbol 3 and Symbol 4 in the same direction.

Figure 10:
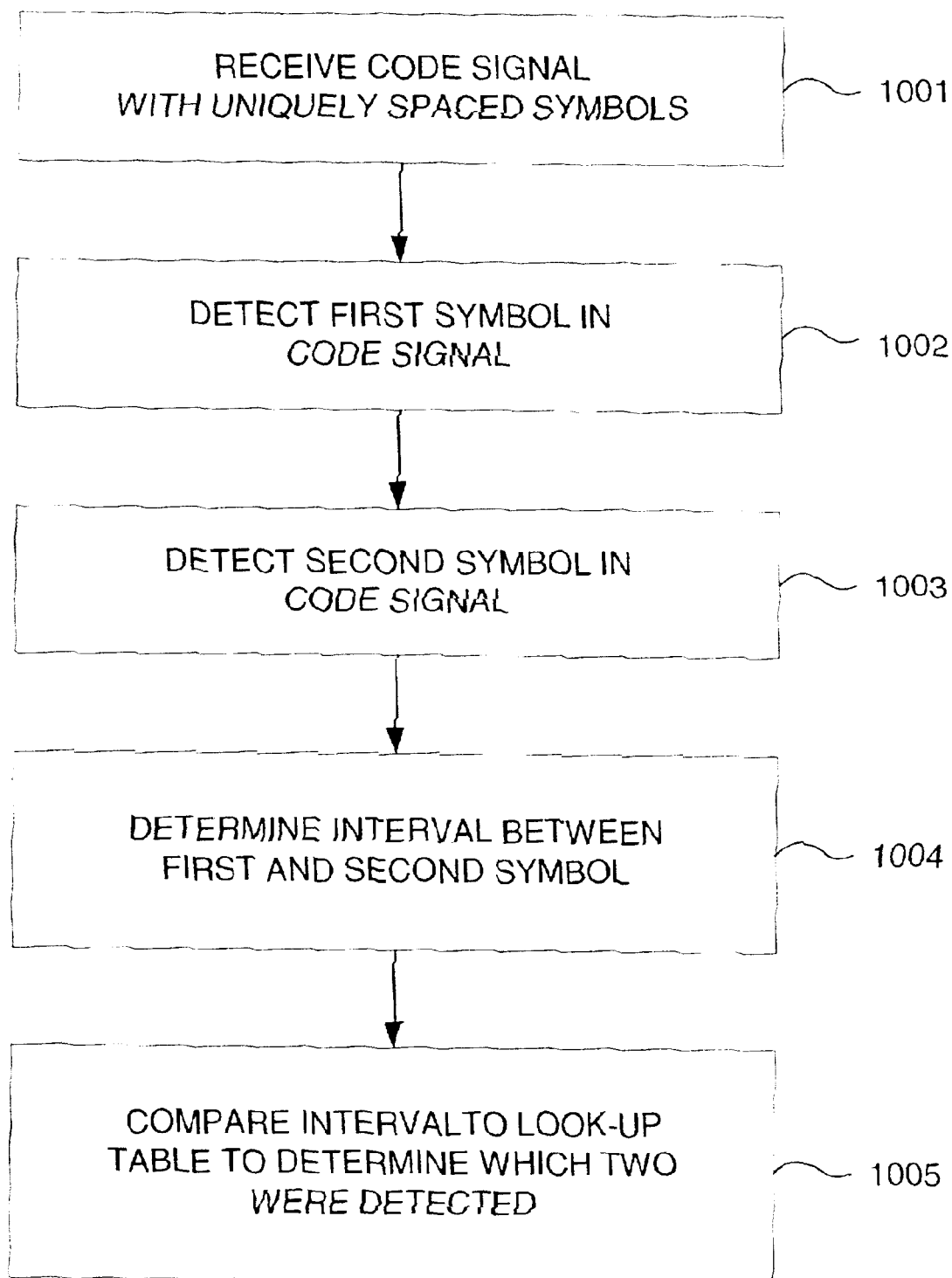
FIG. 10 illustrates a flow diagram of the basic method according to the present invention.

FIG. 10 depicts a high level flow diagram of the basic method disclosed. Upon reception of the code signal 1001, the receiver attempts to detect a first pulse, or symbol, in the code signal 1002. Once this first symbol is detected, the receiver attempts to detect a second symbol 1003. The interval between the first and second detected symbols is calculated 1004, and then compared to a look-up table that lists the unique inter-symbol intervals for each symbol pair. Because the interval values can be substantially unique, the timing of the receiver's initial detection attempt can be determined with respect to the code signal, and, thus, the receiver timer may be adjusted to be synchronized with respect to the code signal.

Figure 11:
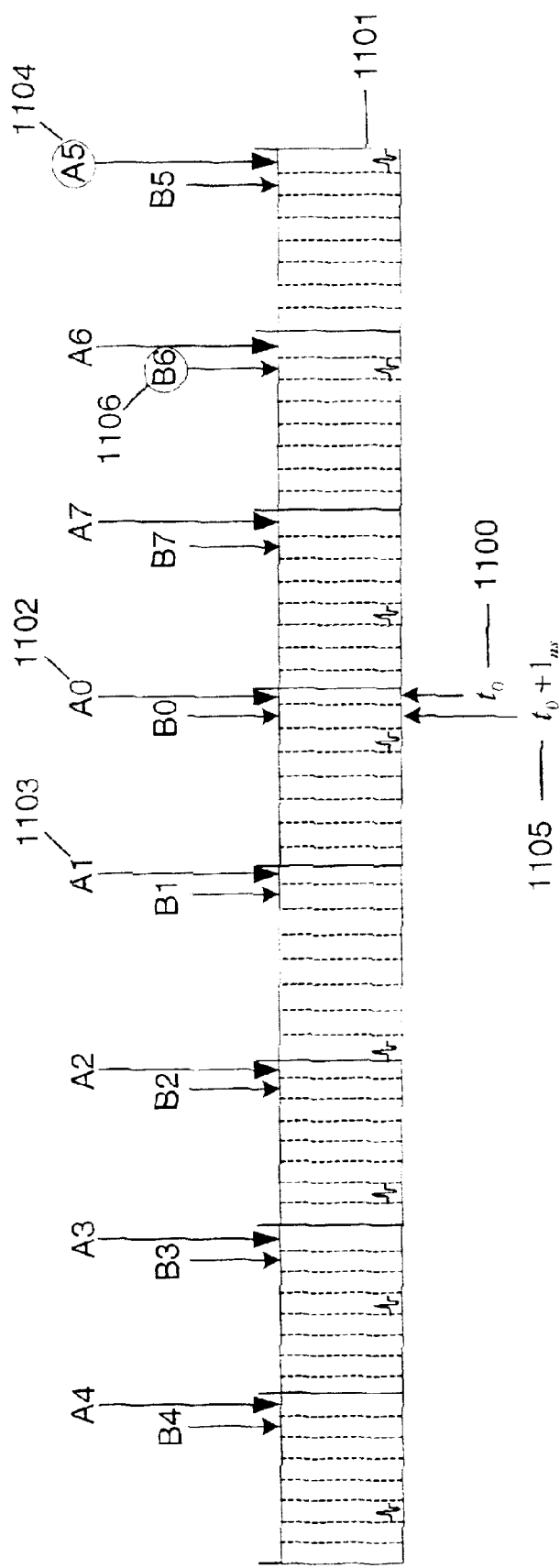
FIG. 11 illustrates an embodiment of the basic synchronization method using an example code signal.

Detection of the first symbol may be obtained by a variety of searching algorithms known in the art. Such methods include binary searching, N-ary searching and pseudo-random searching, all of which may provide some benefit in faster detection of the first symbol and can be performed on a frame-by-frame basis or on a subframe-by-subframe basis. Additionally, the first symbol may be detected by simply starting at some random subframe and searching each subframe sequentially. FIG. 11 depicts a sequential frame-by-frame method of detecting the first symbol wherein, assuming that receiver begins its search at some random time, $t_0$ 1100, within the code signal 1101, the receiver timer is programmed to attempt correlation for the duration of a single subframe 1102, and thence delay for the duration of a frame and search the corresponding subframe in the next frame 1103 and so on until all of the corresponding subframes in each frame across the code modulo have been searched. For diagrammatic purposes, the first symbol detection sequence is shown as A0 through A7. These labels are placed for clarity only and otherwise are not relevant to the invention.

For example, if a code signal is constructed of 128 frames of 128 ns duration and each subframe is 1 ns, then the receiver will attempt to correlate at each $t_0+(N*128\ ns)$ for N=0 to N-1, where N is the number of frames in the code modulo. Since each subframe 903 is used at some point in the code, this method is guaranteed to attempt correlation of a subframe with a pulse in it 1104.

Coherent detection methods of receiving UWB pulses, as set forth above, means that correlation of a pulse involves multiple integrations of a single pulse in order to achieve an acceptable signal-to-noise threshold. Thus, each time the receiver attempts detection of a symbol in this embodiment, the code signal is repeated multiple times as the receiver integrates as much as is necessary to determine whether a pulse resides within the subframe.

It should be noted that this method could be implemented using a threshold detection technique, as described in U.S. Pat. No. 3,662,316, to Robbins, and incorporated by reference herein, or any technique that uses time coherent detection means.

Figure 12:
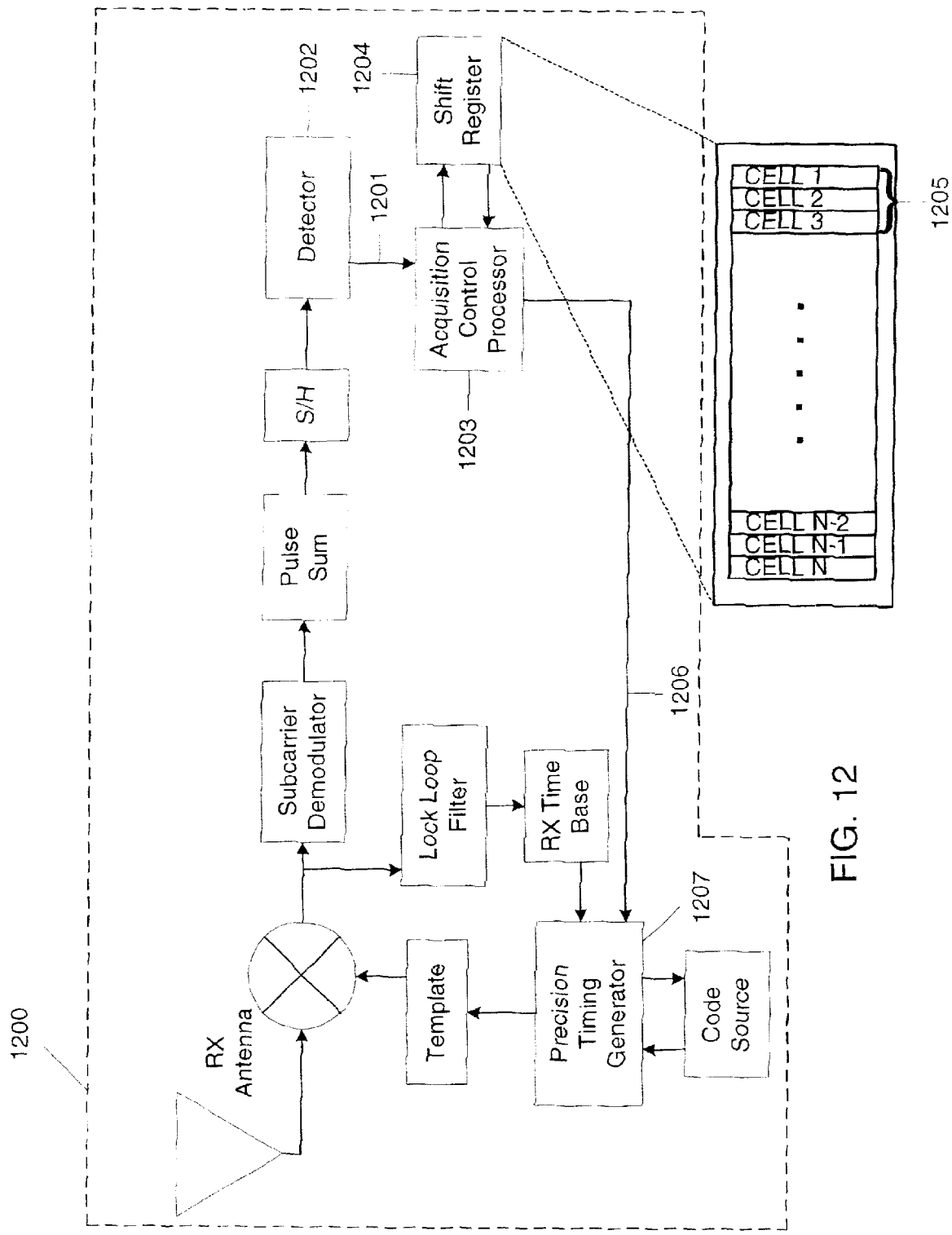
FIG. 12 illustrates a functional diagram of a system for implementing the disclosed method.

Assuming a pulse is detected, its position in time relative to the initiation of the search is stored. FIG. 12 shows one possible embodiment of a receiver 1200 that may implement this method although it is understood that the herein described system is but one of many systems that can accomplish the fast synchronization herein described. Appended to the basic exemplary impulse receiver 1200, the output 1201 of the pulse detector 1202 is sent to an acquisition control processor 1203 to which is coupled a shift register 1204. The shift register is used to retrieve pulse position indications wherein the register is comprised of cells 1205 corresponding to the number of symbols comprising the code. As an example, referring to the code displayed in FIG. 9, since there are eight symbols in the code, there will be 8 cells in the register. It is envisioned that the processor 1203 comprises a memory, which at a minimum houses the data structures that list each inter-symbol interval for the code or codes used. As depicted the receiver includes a code source 1207 which stores code signal information for generating code templates; however, one embodiment of this present case could include storage of the code in the processor 1203.

The shift register may integrate the correlator output or it may receive and store the pre-integrated values as depicted in FIG. 12. In either case the integrated value of a search attempt can be one of two values: a digital "1" if the integration attempts breach a minimum threshold and a "0" if it does not. Once the integrated value is obtained, it is stored in the corresponding cell in the register and the register shifts one cell. This operation is repeated N times, assuming N is the number of frames in the code modulo, thereby scanning through the entire code looking for pulses at frame-by-frame intervals. The sums from each of these correlation attempts will be stored in the corresponding cell in the register. At the end of the traversal, the register should contain "0" in each cell except for one which will contain a "1", assuming there are no other signals present. The location in the register of this "1" corresponds to the frame in which a pulse was detected. Thus, a first interval with respect to $t_0$ of the first symbol is known. The interval with respect to $t_0$ in subframes may be found simply by:

$$Int t_0 = (i-1)*N+j$$

where i is the cell number in which the "1" was located, j is the number of searches that have been performed, and N is the number of subframes in a frame. Other embodiments may utilize register functionality implemented by other means such as in software data structures, for example, N*N arrays, linked lists, or queues, or in field-programmable gated arrays. A preferred embodiment will incorporate the register function, via a memory device into a processor or similar calculation and control device with suitable memory.

Additionally, in a preferred embodiment, a maximum signal strength value should be simultaneously recorded. This is because in a multi-path environment or an environment in which there are several transmitters, more than one pulse may be detected in a code traversal. The maximum value of the signal strength may be used to choose among signals with which to synchronize.

Once the register has been filled, i.e., when the code modulo has been completely traversed, the first interval with respect to $t_0$ derived from the register 1204 is stored in the processor 1203 with suitable memory and the register 1204 is cleared. The receiver begins its search for the second symbol by attempting to correlate the subframe 1105 adjacent to the subframe 1100 examined at time $t_0$ (or $t_0+1$ subframe) and then searching the corresponding subframes in each frame thereafter until the code modulo is completely traversed, in like manner to the technique for finding the first symbol described above, and a second symbol 1106 is detected. It should be noted that in FIG. 11 and throughout the present application references to adjacent subframes indicating the initiation points for second, third or subsequent search phases are shown in terms of nanoseconds. However, this is done for ease of reference only and should not be construed to limit the duration of a subframe, frame or code modulo.

As in the step of searching for the first symbol, the shift register 1204 or similar device or implementation is used to retrieve the integration values for the second detection step. As in the step of detecting the first symbol, a second interval with respect to $t_0$ in subframes is determined. Using this interval information, determination of the interval, preferably measured in subframes or smaller graduations of time depending upon the accuracy of the timing devices used, between the first and the second detected symbols may be made. The value of this determined interval is then used to match against a look-up table of the inter-symbol intervals. Assuming every interval is unique, location in time of $t_0$ with respect to the start of the code may be accurately known and the receiver timer may be synchronized accordingly.

Using the above-described procedure, an advantage in synchronization time is gained. For example, assuming a code length of 128 symbols, each symbol being 128 ns in duration and assuming that it takes five integration cycles each to obtain an acceptable pulse signal, synchronization can be achieved in a little under 21 ms. Assuming 10 integration cycles, that value is increased to just under 42 ms. Alternatively, the correlation process could be shortened by integrating the samples in parallel using one integrator per frame. Short synchronization times are particularly beneficial when multiple radio transmitters and receivers are operating necessitating the use of long transmission codes for channelization purposes.

It should be noted that because the random starting point in the algorithm, $t_0$, may occur at anywhere in the code signal, some misalignment of the pulse may be perceived by the receiver when attempting to correlate on a subframe-width basis and the signal-to-noise threshold may not be achieved, irrespective of whether a pulse occurs in the examined subframe.

Figure 13:
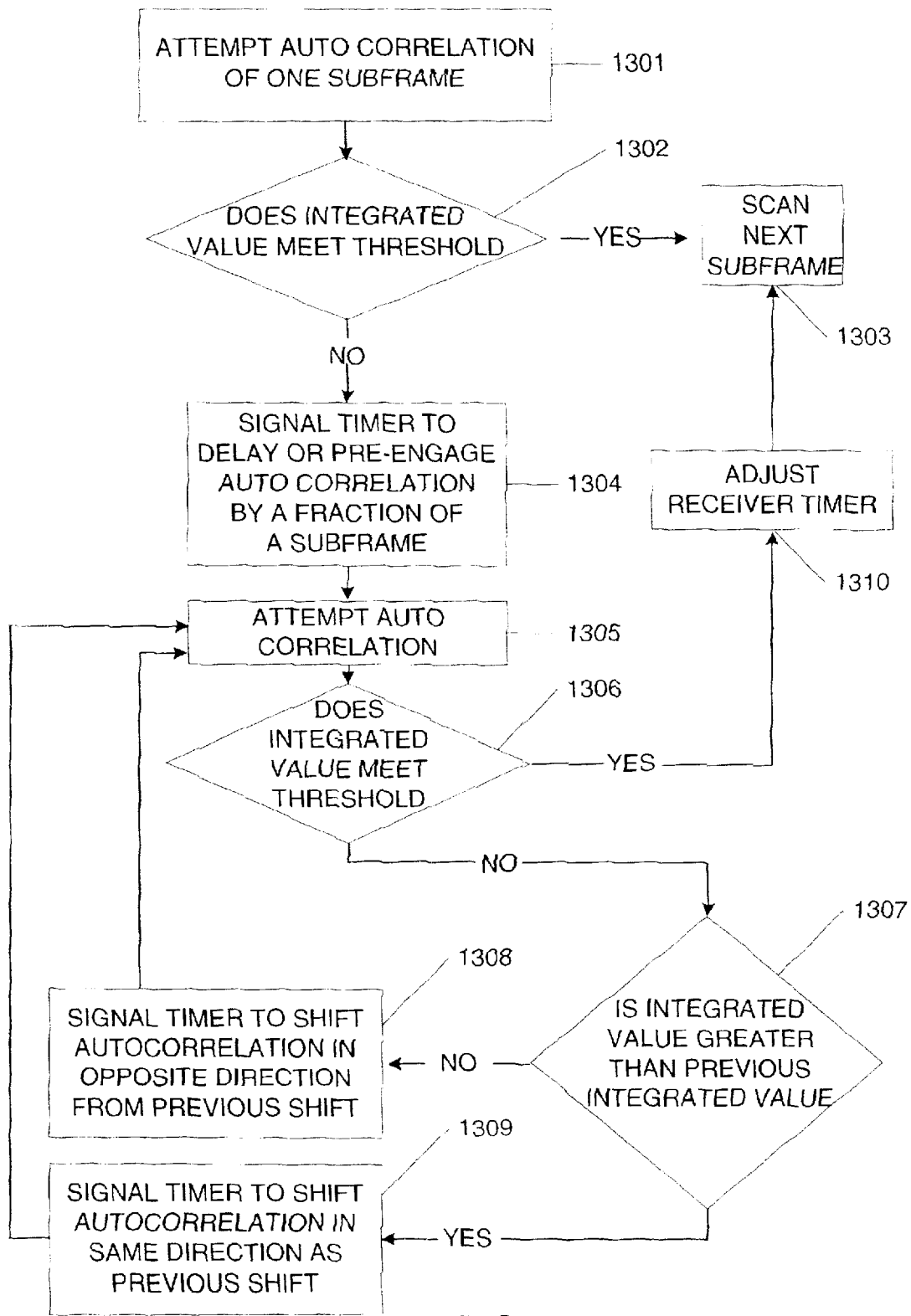
FIG. 13 is a flow diagram of a method for finely adjusting receiver correlation timing within a small fraction of time of the code modulo.

One embodiment incorporates into its detection steps a sub-process, a flow diagram of which is shown in FIG. 13, to finely adjust the receiver timer in order to pick up the greatest signal peak within a subframe 1301. Accordingly, a check is made to determine if the correlation attempt successfully meets the desired threshold 1302. If a signal-to-noise threshold is not achieved, a signal is sent to the timer to shift the initiation of detection by some fraction of a subframe 1304, either earlier or later. Autocorrelation is again attempted 1305 and a threshold check is again performed 1306. If the threshold is not achieved, a further check is performed to determine if the signal value was greater than the previous value obtained 1307. It should be noted that the check could also determine whether the signal value is less than the previous signal. If the signal value is greater than the previous value, the timer commands a shift of detection to occur another fraction of a subframe in the same direction as the previous shift 1309, and correlation is attempted again 1305. On the other hand, if the signal strength is less than the previous value then the timer is cued to shift detection a fraction of a subframe in the opposite direction 1308. If after the second shift signal strength fails to increase, the search may be abandoned and correlation may be attempted on the next subframe to be searched. If at any time the integrated value of resulting from an autocorrelation attempt meets the desired threshold, the receiver may be shifted to scan the next subframe in the search sequence 1303. If a pulse is found, this iteration continues until the position of greatest signal amplitude is achieved. When this occurs, the receiver timer is re-adjusted to initiate its detection attempt in each successive subframe at the same relative point in time 1310.

The fraction of sub-frame to be used depends upon the application. However, fractions of between ⅛ and ¼ are preferable. Adding this step should not increase the overall synchronization time significantly. For a subframe of 1 ns in width, a shift fraction of ⅛ subframe translates to a shift of 125 ps. Assuming a code of 128 symbols, each 128 ns in duration and assuming that it takes 5 integration cycles in addition to 5 of the above-described shift iterations to achieve threshold, the resulting time to synchronize is approximately 104.9 ms. Thus, a time savings is still realized. Shift amounts should be as high as one-quarter of a subframe in multipath environments to avoid masking the signal.

Figure 14:
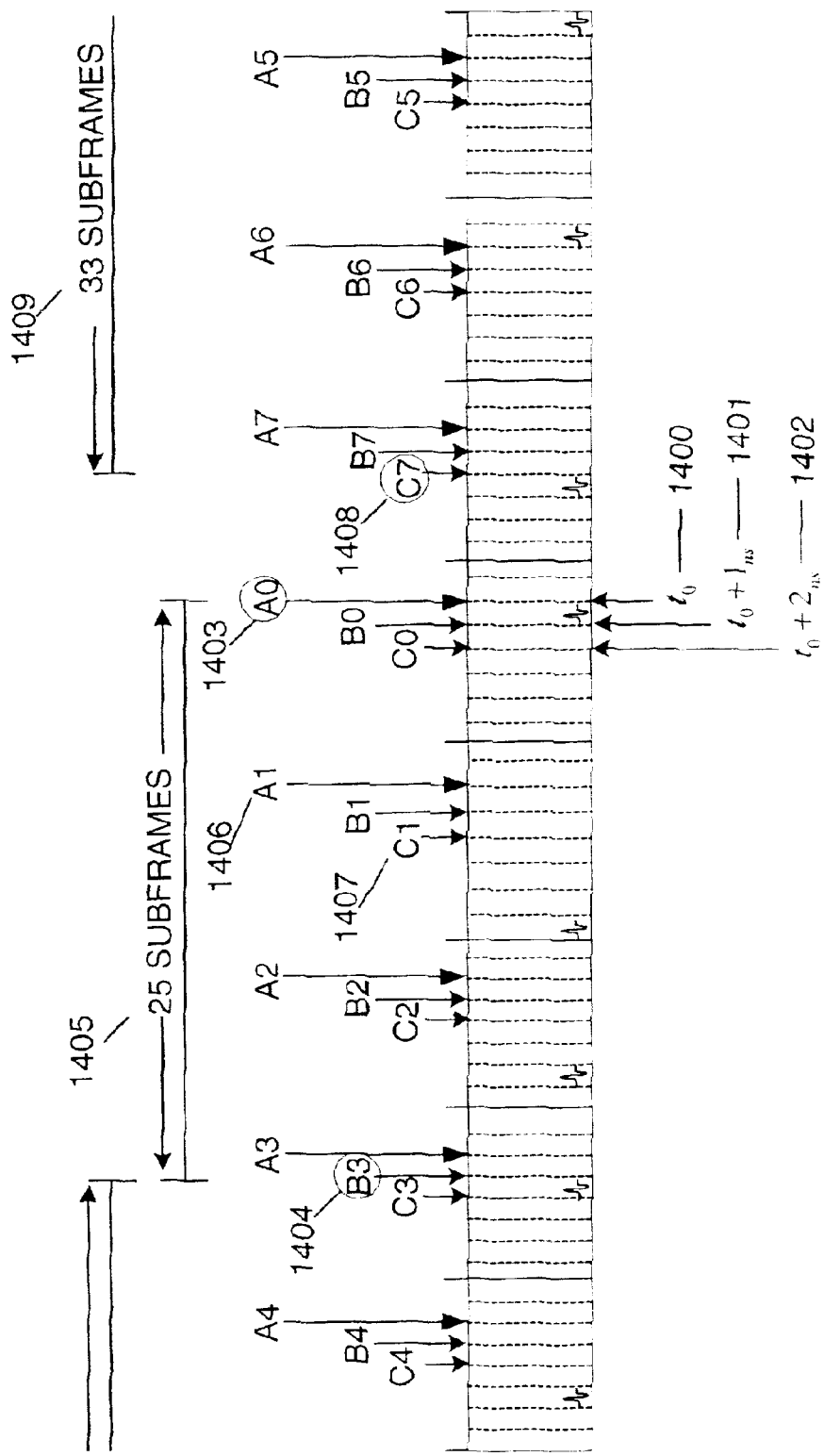
FIG. 14 illustrates an embodiment of a synchronization method that incorporates resolution of interval ambiguities.

As noted above, the code described of length $2^N$ symbols will contain an ambiguous reference in terms of inter-symbol intervals 915. This ambiguity can be resolved, however, by performing a third detection operation and computing a second interval between the latter two detected symbols. FIG. 14 provides an instructive example. The receiver activates at some random $t_0$ 1400, the receiver scans each subframe on a frame-by-frame basis 1406, and a first symbol is detected at the first subframe 1403 relative to $t_0$. The receiver is then shifted to activate at the $t_0+1$ subframe 1401 and each subframe thereafter occurring at frame-by-frame intervals 1407 until the second symbol is found 1404. The interval between the two detected symbols is determined to be 25 subframes 1404. Entering the look-up table of intervals 914 with the value 25 reveals that, in accordance with this example code construct, there are two possible combinations that correspond to that interval value Symbol Sequence 2-3 and Symbol Sequence 7-0 915. Performing a search for a third symbol from the next subframe 1402, or the $t_0+2$ subframe, a third symbol is detected 1408, and calculating the interval between the third and second symbols reveals and interval of 33 subframes 1409. In accordance with the look-up table 914, there is only one symbol pair with that interval, Symbol Sequence 3-4 916. The interval thus determined is unique within the code 916. Attempts are then made to combine the second detected symbol pair 3-4 916 with the two possible first symbol pairs 2-3 and 7-0 915 that each have an interval of 25. The symbol pairs 2-3 and 3-4 can be combined into the sequence 2-3-4. However, the symbol pairs 7-0 and 3-4 cannot be combined. Therefore, the first symbol pair must be 2-3 and the ambiguity is resolved. Once the three detected symbols are identified as the symbol sequence 2-3-4, the positioning of the subframes in which the three symbols were detected relative to $t_0$ and the known positioning of the symbols within the code modulo can be used to synchronize the receiver with the transmitted signal.

For the example depicted in FIG. 14, the location of the first symbol at 1403 relative to $t_0$ and its known positioning in the code modulo can be used to calculate that $t_0$ can be delayed 38 ns to synchronize the receiver at the start of the code modulo. Specifically, because the first symbol was found at the arbitrarily selected to, the subframe in which the pulse corresponding to the first symbol is known to reside in the 27$^{th}$ subframe of the code modulo, and the code modulo is comprised of 64 subframes of 1 ns duration each, $t_0$ can be delayed (0−27+1) mod 64=38 subframe durations (or 38 ns) to position $t_0$ at the start of the code modulo. Furthermore, had the first symbol been detected at some other location than t0, the known number of corresponding subframes searched before detecting the symbol, where each succeeding searched subframe is separated by 8 subframes, can be accounted for when calculating the adjustment to $t_0$. For example, had the first symbol (2) been detected at the second search location 1406 instead of the first search location 1403, $t_0$ would need to be delayed ((−8)*(2−1)−27+1) mod 64=32 subframes (or 32 ns) to synchronize.

Codes may be constructed that have only one ambiguity regardless of their code length. In other words, codes of length N can be produced where only 2 out of N symbol pairs have the same inter-symbol interval. Thus, for any two detected symbols, there is a 2 in N chance that the detected symbol pair will have an inter-symbol interval that is the same as another symbol pair. Furthermore, the probability of encountering an ambiguity decreases as code length increases. For example, a code of length 25 can be constructed where the probability of encountering an ambiguity when two symbols are detected is 8% whereas the probability of encountering an ambiguity for a code of length 128 is only 1.6%.

As describe above, when an ambiguity does exist, an additional symbol can be detected to resolve the ambiguity, in which case the time to synchronize increases by 50%. Thus, for a code of length 128, there is a 98.4% probability that synchronization will require approximately 42 ms and a 1.6% probability that synchronization will require approximately 63 ms. A less-attractive approach that can be taken when an ambiguity is encountered is to select a different $t_0$ that is offset in time from the previous $t_0$ by an amount of time other than a multiple of the time duration of a frame (i.e., $t_{0new} \neq t_{0old} + N^*$ frame time duration). Under this arrangement, a different symbol pair will be detected that does not have an ambiguity, but the time to synchronize the receiver increases by an additional 50% over that of the previously described approach since two additional symbols must be detected instead of one.

In the case of the reception of multipath signals, two or more pulses may be detected upon traversal of the code modulo as described above. In this event, additional search steps may be required to again resolve ambiguity. Preferably, the processor would be programmed to calculate the intervals for each possible combination of symbols and test each combination against the look-up table to determine which combinations of symbols are consistent with the code used. In this way both the direct signal and the multipath signal may be resolved. Furthermore, it is envisioned that recordation of the amplitudes of the detected pulses will allow the receiver to discriminate between the direct path and the multipath signals.

Figure 15:
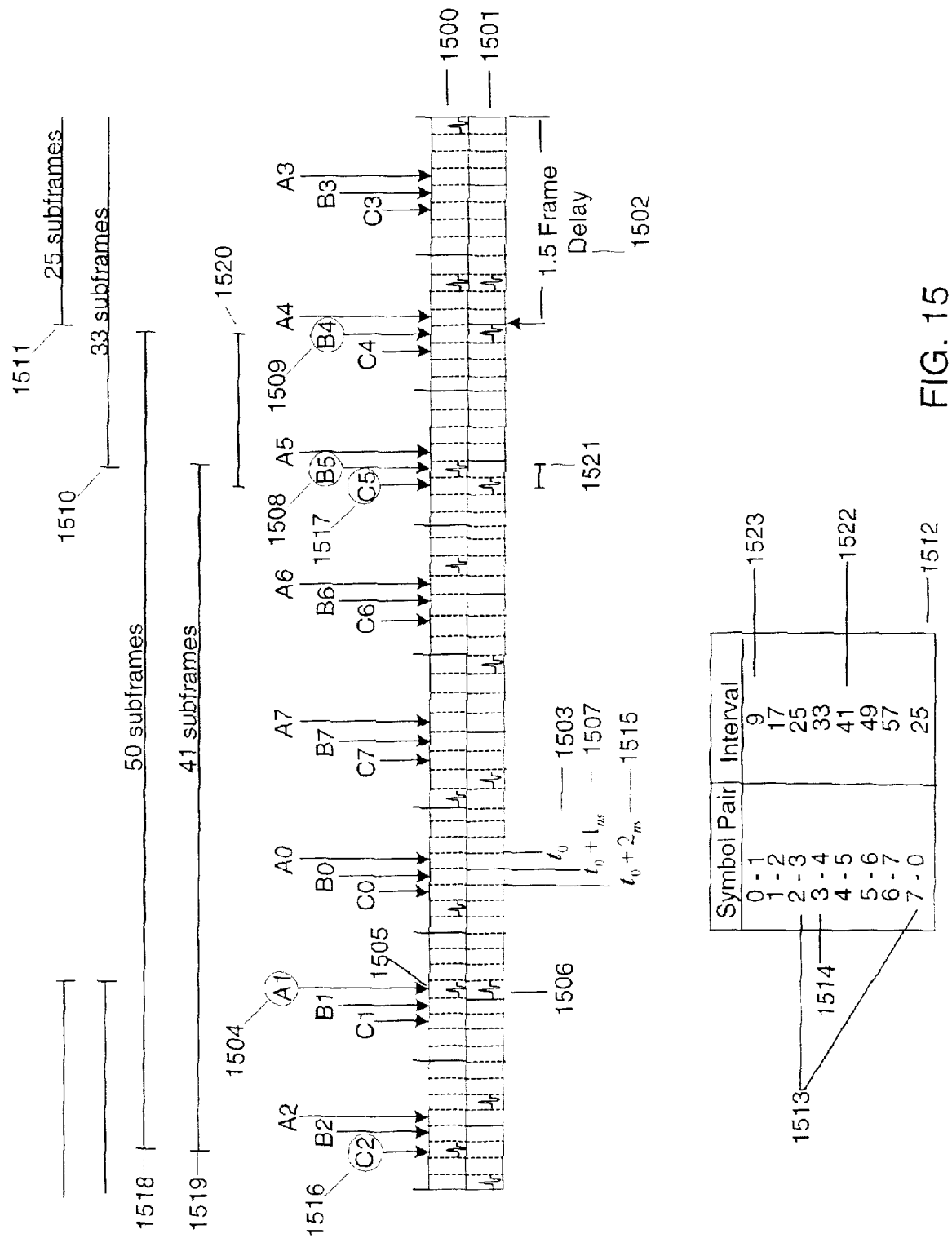
FIG. 15 illustrates an embodiment of a synchronization method that resolves ambiguities between direct and reflected signals.

For example, with reference to FIG. 15, a direct signal 1500, is received concurrently with a multipath signal 1501 which lags the direct signal by 1.5 frames 1502. Starting at some random $t_0$ 1503, the receiver begins to search for the first symbol and at search stage A1 1504 detects two pulses, one in the direct signal 1505 and one in the reflected signal 1506. The timing of both pulses with respect to $t_0$ is 9 subframes. The receiver commences searching for a second symbol at time $t_0$+1 subframe 1507, and again detects one pulse in the direct path shown at search point B5 1508 and one in the reflected path at search point B4 1509. Since the receiver cannot know if any pulse out of the four detected is from a direct signal or from an ambiguous signal, it is not possible at this stage to determine which is the correct sequence of symbols. The intervals for each possible combination of symbols must be determined and tested in order to resolve the ambiguity between the symbols.

The interval between symbols found at A1 and B5 is 33 1510, between those found at A1 and B4 is 25 1511. In this example two pulses occurred simultaneously at point A1. The receiver will not discriminate between the two pulses, but will "see" only one pulse of a higher than normal value, which facilitates correlation of the individual pulse. For this example, however, it results in only two cases to test. It should be recognized that depending on the initiation of the search, $t_0$ 1503, the receiver could have easily detected two pulses in the first search step resulting in four possible combinations of symbols for which intervals must be determined.

The look-up table 1512 reveals that the interval between paired symbols found at A1 and B4 can match the inter-symbol intervals of either of the two symbol pairs 2-3 or 7-0 1513 (i.e., an ambiguity exists) and the interval between paired symbols found at A1 and B5 matches the inter-symbol interval of the symbol pair 3-4 1514. Starting at $t_0$+2 subframes 1515, the receiver performs a third search through the code modulo and detects pulses at points C2 1516 and C5 1517. The inter-symbol intervals for the two combinations of the second and third sets of detected pulses are determined. For the first combination, the interval between paired symbols found at B4 and C2 is 50 subframes 1518 and the interval between paired symbols found at B5 and C5 is 1 subframe 1521. For the second combination, the interval between paired symbols found at B4 and C5 is 9 subframes and the interval between paired symbols found at B5 and C2 is 41 subframes 1519. The look-up table reveals the first combination is not possible (i.e., values of 50 and 1 are not in the look-up table) and thus the symbols found at B4 and C5 are the symbol pair 0-1 1523 and the symbols found at B5 and C2 correspond to the symbol pair 4-5 1522.

Once the possible symbol pairings are determined, the possible three-symbol combinations are evaluated. This process involves attempting to combine the possible symbol pairs of the first and second sets of detected pulses with the determined symbol pairs of the second and third sets of detected pulses. The various three-symbol combinations are attempted. In the first combination, there are two test cases due to the ambiguity. For case 1, the symbol pair 2-3 is combined with symbol pair 0-1 and the symbol pair 3-4 is combined with symbol pair 4-5. For case 2, the symbol pair 7-0 is combined with symbol pair 0-1 and the symbol pair 3-4 is combined with symbol pair 4-5. Case 1 is not possible since symbol pairs 2-3 and 0-1 do not have a common symbol. Case 2 is possible because 7-0 and 0-1 have the common symbol 0 and because symbol pairs 3-4 and 4-5 have the common symbol 4. For the second combination, there are also two test cases due to the ambiguity. For case 1, the symbol pair 2-3 is combined with symbol pair 4-5 and the symbol pair 3-4 is combined with symbol pair 0-1. For case 2, the symbol pair 7-0 is combined with symbol pair 4-5 and the symbol pair 3-4 is combined with symbol pair 0-1. Neither of the two test cases of the second combination is possible since there are no common symbols. Thus, the second case of the first combination is the correct one and the symbols found at A1, B4, and C5 correspond to symbols 7, 0 and 1 of one received signal and the symbols found at A1, B5, and C2 correspond to symbols 3, 4, and 5 of a second signal. The receiver may adjust its timing to synchronize with either of the two signals.

As described above and shown in the associated drawings, the present invention comprises a method and system fast synchronization of impulse radio receivers. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A method for fast acquisition of impulse radio signals, comprising the steps of:

a. receiving via an impulse radio receiver a signal, said signal comprises a plurality of symbols and an interval between each such symbol in said signal is substantially unique;

b. detecting a first detected symbol and a second detected symbol of any adjacent two of said symbols in said signal;

c. determining a first interval between said first detected symbol and said second detected symbol; and d. comparing said first interval to a set of intervals, said set of intervals being a set of the intervals between each symbol in said signal to determine the timing of said first detected symbol and said second detected symbol with respect to said signal.

2. The method according to claim 1, wherein said step of detecting a first detected symbol and a second detected symbol comprises the steps of a. searching a temporal division of the signal; and b. iteratively varying initiation of the search by some time equal to a fraction of the duration of said temporal division.

3. The method according to claim 2, wherein said fraction is at least ¼.

4. The method according to claim 2, wherein said fraction is at most ¼.

5. The method according to claim 2, wherein said fraction is at least ⅛.

6. The method according to claim 1, further comprising the steps of a. detecting a third detected symbol;

b. determining a second interval between said third detected symbol and said second detected symbol; and c. comparing said second interval to said set of intervals to determine the timing of a sequence of detected symbols comprised of said first detected symbol, said second detected symbol, and said third detected symbol.

7. The method according to claim 6, wherein said step of detecting said third detected symbol comprises:

a. searching a temporal division of the signal; and b. iteratively varying initiation of the search by some time equal to a fraction of the duration of said temporal division.

8. The method according to claim 7, wherein said fraction is at least ¼.

9. The method according to claim 7, wherein said fraction is at most ¼.

10. The method according to claim 9, wherein said fraction is at least ⅛.

11. The method according to claim 6, further comprising the steps of a. detecting an $n^{th}$ detected symbol, wherein n is an integer;

b. determining an $n-1^{th}$ interval between said $n^{th}$ detected symbol and an $n-1^{th}$ detected symbol; and c. comparing said $n-1^{th}$ interval to said set of intervals, to determine the timing of a sequence of detected symbols comprised of n detected symbols.

12. The method according to claim 11, wherein said step of detecting said $n^{th}$ detected symbol further comprises the steps of:

a. searching for the duration of a temporal division, $\delta$, of said signal; and b. iteratively varying initiation of the search by some time equal to a fraction of said $\delta$.

13. The method according to claim 12, wherein said fraction is at least ¼.

14. The method according to claim 12, wherein said fraction is at most ¼.

15. The method according to claim 14, wherein said fraction is at least ⅛.

16. The method according to claim 12, wherein detecting said first detected symbol and said second detected symbol and said nth detected symbol comprises:

a. searching a time period approximately equal to said $\delta$;

b. delaying searching for a multiple of said $\delta$; and c. repeating as required until said signal has been traversed.

17. The method according to claim 16, wherein said multiple occurs according to any one of a group of searching algorithms consisting of pseudo-random searching, binary searching, and N-ary searching, wherein N is an integer.

18. The method according to claim 16, wherein detecting said first detected symbol comprises initiating a search for said first detected symbol at some random time, $t_0$.

19. The method according to claim 18, wherein detecting said second detected symbol comprises initiating a search for said second detected symbol at some time, $t_0+\delta$.

20. The method according to claim 19, wherein detecting said $n^{th}$ detected symbol comprises initiating a search for said nth detected symbol at some time, $t_0+(n-1)*\delta$.

21. The method according to claim 20, wherein said signal is comprised of $2^N$ symbols, wherein N is an integer.

22. The method according to claim 20, wherein a. said signal is comprised of S symbols, wherein S is an integer;

b. each of said S symbols is a frame of time comprised of S subframes;

c. each of said subframes is a period of time of sufficient duration for a pulse to occur within said subframe; and d. each of said S symbols is represented by a pulse occurring in a subframe in each frame such that no pulse occurs in corresponding subframes in any other frame in said signal.

23. The method according to claim 22, wherein said signal is comprised of said S symbols such that an $i^{th}$ symbol is represented by a frame of sequentially occurring subframes and a pulse occurring in an $i^{th}$ subframe of said frame.

24. A method for acquisition of impulse radio signals, comprising the steps of:

a. transmitting via an impulse radio transmitter a pulse train in accordance with a code signal, said pulse train being comprised of a plurality of pulses occurring in time such that a time interval between each of said plurality of pulses is substantially unique;

b. receiving said pulse train via an impulse radio receiver;

c. detecting a first pulse and a second pulse of two adjacent pulses of said pulse train, said detecting of said first pulse being initiated at some random time, $t_0$;

d. determining a timing value of said first pulse and said second pulse relative to $t_0$;

e. determining a first interval between said first pulse and said second pulse;

f. comparing said first interval to a set of intervals, said set of intervals being a set of the intervals between each pulse in said pulse train to determine the timing of said first pulse and said second pulse with respect to said code signal; and g. adjusting the timing of said impulse radio receiver with respect to $t_0$ and said code signal.

25. The method according to claim 24, further comprising the steps of:
    a. detecting an $n^{th}$ pulse;
    b. determining a timing value of said $n^{th}$ pulse relative to $t_0$;
    c. determining an $n-1^{th}$ interval between said $n^{th}$ pulse and an $n-1^{th}$ pulse; and
    d. comparing said $n-1^{th}$ interval to said set of intervals to determine the timing of a sequence of n pulses with respect to said code signal.

26. The method according to claim 25, further comprising the step of testing each possible combination of said pulses to determine a proper sequence comprised of said pulses, said sequence being defined by said code signal.

27. A system for fast synchronization of impulse radio receiver timers, comprising:
    a. a means for transmitting an impulse radio pulse train, said pulse train being comprised of a plurality of pulses occurring in time such that a time interval between each of said plurality of pulses is substantially unique, said plurality of pulses corresponding to a set of intervals;
    b. a means for receiving said pulse train responsive to said transmitting means;
    c. a means for detecting any of said pulses responsive to said receiving means; and
    d. a means for determining an interval between any adjacent two of said pulses and comparing said interval to said set of intervals to determine the timing of a sequence of pulses in said pulse train.

28. The system according to claim 27, wherein said means for determining said interval and comparing said interval is a processor, said processor programmed to implement data structures, said data structures being capable of receiving and storing pulse timing data with respect to said pulse train and a set of intervals, said set of intervals being comprised of the intervals between each of said pulses in said pulse train.

29. The system according to claim 27, wherein said means for determining said interval and comparing said interval is implemented with a field programmable gated array.

30. The system according to claim 27, wherein said means for determining said interval and comparing said interval is implemented with a shift register.

* * * * *